(12) United States Patent
Baek et al.

(10) Patent No.: US 10,798,761 B2
(45) Date of Patent: Oct. 6, 2020

(54) METHOD FOR ESTABLISHING PROTOCOL DATA UNIT SESSION IN COMMUNICATION SYSTEM

(71) Applicants: Samsung Electronics Co., Ltd, Suwon-si (KR); Korea University Research and Business Foundation, Seoul (KR)

(72) Inventors: Young-Kyo Baek, Seoul (KR); Jung-Je Son, Yongin-si (KR); Sung-Hoon Kim, Seoul (KR); Sang-Heon Pack, Seoul (KR); Ho-Yeon Lee, Seongnam-si (KR); Han-Eul Ko, Goyang-si (KR); Won-Jun Lee, Seoul (KR); Cheng Long Shao, Seoul (KR); Jae-Wook Lee, Seoul (KR); Hee-Jun Roh, Seoul (KR); Tae-Kyung Kim, Seoul (KR); Sun-Jae Kim, Seoul (KR)

(73) Assignees: Samsung Electronics Co., Ltd., Suwon-si (KR); Korea University Research and Business Foundation, Seoul (KR)

( * ) Notice: Subject to any disclaimer, the term of this patent is extended or adjusted under 35 U.S.C. 154(b) by 155 days.

(21) Appl. No.: 16/003,530

(22) Filed: Jun. 8, 2018

(65) Prior Publication Data

US 2018/0359795 A1 Dec. 13, 2018

(30) Foreign Application Priority Data

Jun. 9, 2017 (KR) .................. 10-2017-0072750

(51) Int. Cl.
*H04W 76/12* (2018.01)
*H04W 48/18* (2009.01)
(Continued)

(52) U.S. Cl.
CPC ............ *H04W 76/12* (2018.02); *H04L 67/14* (2013.01); *H04W 48/18* (2013.01); *H04W 4/40* (2018.02)

(58) Field of Classification Search
CPC ....... H04L 67/14; H04L 67/141; H04L 67/28; H04L 69/322; H04W 4/40; H04W 48/18; H04W 76/12
See application file for complete search history.

(56) References Cited

U.S. PATENT DOCUMENTS

2017/0303259 A1* 10/2017 Lee ...................... H04W 28/16
2017/0359749 A1* 12/2017 Dao .................... H04L 47/2416
(Continued)

OTHER PUBLICATIONS

"3rd Generation Partnership Project; Technical Specification Group Services and System Aspects; Feasibility Study on New Services and Markets Technology Enablers; Stage 1 (Release 14)", 3GPP TR 22.891 V1.0.0 (Sep. 2015), 74 pages.
(Continued)

*Primary Examiner* — Gbemileke J Onamuti

(57) ABSTRACT

A method for establishing a plurality of protocol data unit (PDU) sessions between a user equipment (UE) and a data network (DN) by the UE may comprise transmitting a message to establish the plurality of PDU sessions to at least one network function (NF) of a plurality of NFs, exchanging a signal to establish the plurality of PDU sessions among the UE, a radio access network (RAN), and the plurality of NFs based on the message, and establishing the plurality of PDU sessions between the UE and the DN according to predetermined priority and based on the signal, wherein each of the plurality of PDU sessions corresponds to a network slice (NS) for a particular service, wherein the message includes information about the particular service corresponding to the plurality of PDU sessions, and wherein the priority is
(Continued)

determined based on the information about the particular service.

13 Claims, 25 Drawing Sheets

(51) Int. Cl.
*H04W 4/40* (2018.01)
*H04L 29/08* (2006.01)

(56) References Cited

U.S. PATENT DOCUMENTS

| | | | |
|---|---|---|---|
| 2018/0199115 A1* | 7/2018 | Prasad | H04N 21/64 |
| 2018/0262924 A1* | 9/2018 | Dao | H04W 24/08 |
| 2019/0021010 A1* | 1/2019 | Senarath | H04L 41/0886 |
| 2019/0191348 A1* | 6/2019 | Futaki | H04W 36/12 |
| 2019/0238413 A1* | 8/2019 | Holmstrom | H04L 41/0836 |

OTHER PUBLICATIONS

"3rd Generation Partnership Project; Technical Specification Group Core Network; Mobile radio interface signalling layer 3; General aspects (3G TS 24.007 version 3.1.0)", 3G TS 24.007 V3.1.0 (Oct. 1999), 126 pages.

"Digital cellular telecommunications system (Phase 2+); Universal Mobile Telecommunications System (UMTS); LTE; Policy and charging control architecture (3GPP TS 23.203 version 12.6.0 Release 12)", ETSI TS 123 203 V12.6.0 (Sep. 2014), 221 pages.

"3rd Generation Partnership Project; Technical Specification Group Services and System Aspects; Procedures for the 5G System; Stage 2; (Release 15)", 3GPP TS 23.502 V0.0.0 (Jan. 2017), 13 pages.

"3rd Generation Partnership Project; Technical Specification Group Services and System Aspects; Service requirements for next generation new services and markets; Stage 1 (Release 15)", 3GPP TS 22.261 V0.1.1 (Aug. 2016), 24 pages.

"3rd Generation Partnership Project; Technical Specification Group Services and System Aspects; Study on Architecture for Next Generation System (Release 14)", 3GPP TR 23.XXX V0.1.0 (Nov. 2015), 8 pages.

"3rd Generation Partnership Project; Technical Specification Group Services and System Aspects; System Architecture for the 5G System; Stage 2; (Release 15)", 3GPP TS 23.501 V0.0.0 (Jan. 2017), 14 pages.

"3rd Generation Partnership Project; Technical Specification Group Services and System Aspects Vocabulary for 3GPP Specifications (3G TR 21.905 version 0.1.0)", 3G TR 21.905 V0.1.0 (Oct. 1999), 22 pages.

* cited by examiner

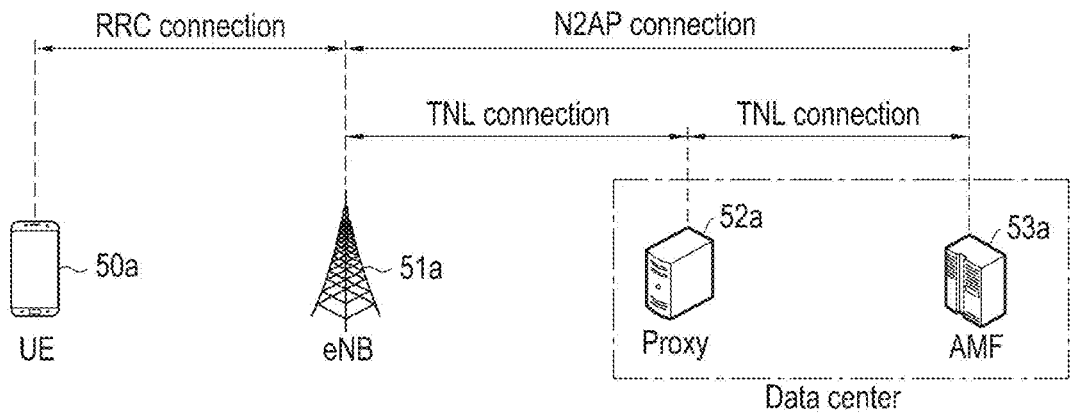
FIG.11
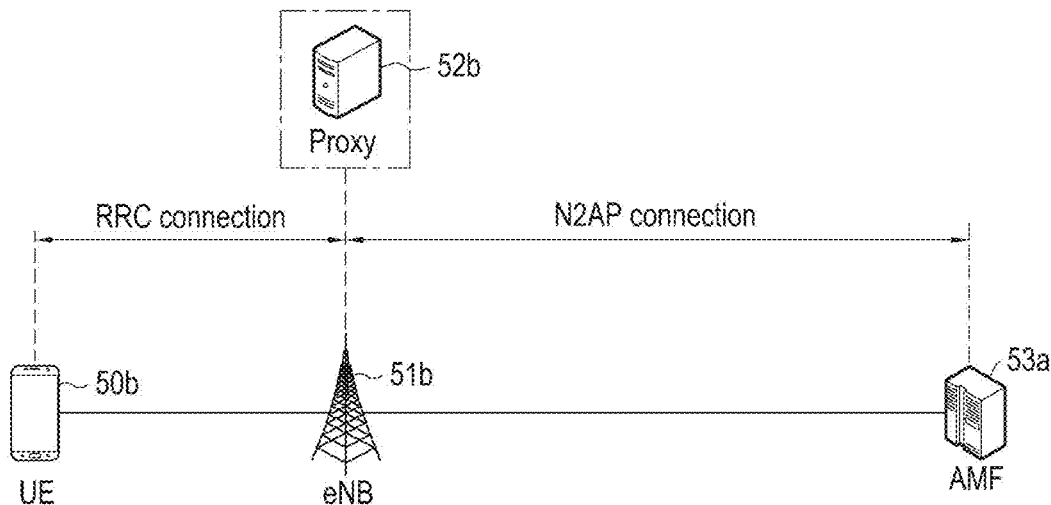
FIG.12
Temp ID Format (1300)
| MCC (1310) | MNC (1330) | AMF group ID (1350a) | AMF instance ID (1370) | M-TMSI (1390) |
|---|---|---|---|---|
= Proxy ID (1350b)
FIG.13

METHOD FOR ESTABLISHING PROTOCOL DATA UNIT SESSION IN COMMUNICATION SYSTEM

CROSS-REFERENCE TO RELATED APPLICATION AND CLAIM OF PRIORITY

This application is based on and claims priority under 35 U.S.C. § 119 to Korean Patent Application No. 10-2017-0072750 filed on Jun. 9, 2017, in the Korean Intellectual Property Office, the disclosure of which is incorporated by reference herein in its entirety.

BACKGROUND

1. Field

The disclosure relates to methods for establishing a protocol data unit (PDU) session in a communication system, and more specifically, to methods for establishing a plurality of PDU sessions.

2. Description of Related Art

In order to meet the demand for wireless data traffic soaring since the 4G communication system came to the market, there are ongoing efforts to develop enhanced 5G communication systems or pre-5G communication systems. For the reasons, the 5G communication system or pre-5G communication system is called the beyond 4G network communication system or post LTE system.

For higher data transmit rates, 5G communication systems are considered to be implemented on ultra high frequency bands (mmWave), such as, e.g., 60 GHz. To mitigate pathloss on the ultra high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and reception interference cancellation.

There are also other various schemes under development for the 5G system including, e.g., hybrid FSK and QAM modulation (FOAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

5G network technology is a successor to 4G LTE mobile communication technology and seeks an end-to-end (E2E) system in which all targets are highly integrated over a network providing access in a wired or other various schemes. To that end, ITU-R, ITU-T, NGMN, 3GPP or other standardization organizations are designing brand-new clean slate-type systems and network architectures to implement wireless and wired network technology featuring high performance, low latency, and high availability.

A most prominent feature of 5G networks lies in adopting network slicing for radio access networks (RANs) and core networks (CNs). This is intended for bundling up network resources and network functions into a single independent slice depending on individual services, allowing for application of network system function and resource isolation, customization, independent management and orchestration to mobile communication network architectures. The use of such network slicing enables offering 5G services in an independent and flexible way by selecting and combining 5G system network functions according to services, users, business models, or such references.

The slice over a 5G network provides customized 5G network services by combining control plane (CP) and user plane (UP) network functions for 5G services necessary for a particular service over a core network and a radio access network.

The above information is presented as background information only to assist with an understanding of the disclosure. No determination has been made, and no assertion is made, as to whether any of the above might be applicable as prior art with regard to the disclosure.

SUMMARY

According to the disclosure, there is provided a method for establishing a plurality of PDU sessions, capable of reducing duplicate signaling processes, minimizing the number of interactions between a user equipment (UE) and a CN, and establishing a PDU session, which is sensitive to latency as are critical (CriC) services, as soon as possible.

According to the disclosure, there is provided a method for establishing a plurality of PDU sessions, capable of reducing latency in exchanging non-access stratum (NAS) messages between a UE and a core access and mobility management function (AMF) when the AMF is changed when supporting connectivity between the UE and the AMF.

According to an embodiment, a method for establishing a plurality of protocol data unit (PDU) sessions between a user equipment (UE) and a data network (DN) by the UE comprises transmitting a message to establish the plurality of PDU sessions to at least one network function (NF) of a plurality of NFs, exchanging a signal to establish the plurality of PDU sessions among the UE, a radio access network (RAN), and the plurality of NFs based on the message, and establishing the plurality of PDU sessions between the UE and the DN according to predetermined priority and based on the signal, wherein each of the plurality of PDU sessions corresponds to a network slice (NS) for a particular service, wherein the message includes information about the particular service corresponding to the plurality of PDU sessions, and wherein the priority is determined based on the information about the particular service.

According to an embodiment, a method for establishing, by a UE, a plurality of PDU sessions between the UE and a data network (DN) in a system including a core network (CN) including a plurality of NFs, the UE, a RAN, the DN, and a proxy-based first NF connected to each of the NFs and the RAN comprises performing first sticky connection between the RAN and the proxy and second sticky connection between the proxy and the first NF and transmitting a message to establish the plurality of PDU sessions between the UE and the DN using the first sticky connection and the second sticky connection between the RAN and the first NF.

According to an embodiment, a UE configured to establish a plurality of PDU sessions with a DN comprises a transceiver configured to transmit a message to establish the plurality of PDU sessions to at least one NF of a plurality of NFs and exchange a signal to establish the plurality of PDU sessions among a RAN and the plurality of NFs based on the message and a controller configured to establish the plurality of PDU sessions between the UE and the DN according to predetermined priority and based on the signal, wherein each of the plurality of PDU sessions corresponds to a network slice (NS) for a particular service, wherein the message includes information about the particular service corresponding to the plurality of PDU sessions, and wherein the priority is determined based on the information about the particular service.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 11 and 12 illustrate various examples of implementing a proxy-based NF;

FIG. 13 illustrates compatibility between a temporary ID (temp ID) architecture according to an embodiment of the present disclosure;

Throughout the drawings, like reference numerals will be understood to refer to like parts, components, and structures.

DETAILED DESCRIPTION

Figure 1:
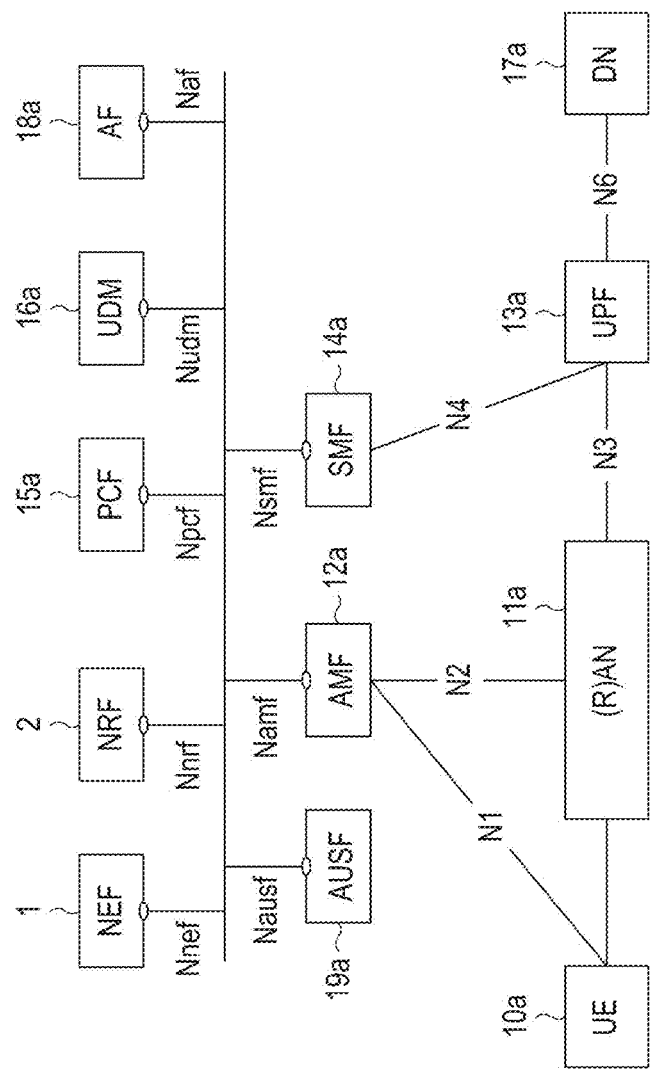
FIGS. 1 and 2, respectively, illustrate a 5G system architecture and a non-roaming 5G system architecture represented with reference points.

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following detailed description taken in conjunction with the accompanying drawings is provided for a comprehensive understanding of various embodiments of the disclosure which are defined by the appended claims or equivalents thereof. However, various particular matters set forth below in the detailed description should be regarded simply as examples. Hence, it should be appreciated by one of ordinary skill in the art that various changes or modifications may be made to the embodiments without departing from the spirit or scope of the disclosure. Known functions and components related to the disclosure may be excluded from the description for clarity and brevity.

The terms and words used herein should not be interpreted as limited to their literal meanings, and it should be noted that they are rather provided merely for a clear and consistent understanding of the disclosure. Thus, it is apparent to one of ordinary skill in the art that the detailed description of various embodiments of the disclosure is intended for description purposes alone, but not for limiting the subject matter of the disclosure defined by the appended claims and equivalents thereof.

As used herein, the singular forms "a," "an," and "the" are intended to include the plural forms as well, unless the context clearly indicates otherwise. Accordingly, as an example, a "component surface" includes one or more component surfaces.

The terms coming with ordinal numbers such as 'first' and 'second' may be used to denote various components, but the components are not limited by the terms. The terms are used only to distinguish one component from another. For example, a first component may be denoted a second component, and vice versa without departing from the scope of the disclosure. The term "and/or" may denote a combination(s) of a plurality of related items as listed or any of the items.

The terms as used herein are provided merely to describe some embodiments thereof, but not to limit the disclosure. It is to be understood that the singular forms "a," "an," and "the" include plural references unless the context clearly dictates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the embodiments of the disclosure belong. Such terms as those generally defined in the dictionary should be appreciated to be consistent with contextual meanings of relevant technology.

According to an embodiment of the disclosure, an electronic device as disclosed herein may include a communication function. For example, the electronic device may be a smartphone, a tablet PC, a personal computer (PC), a mobile phone, a video phone, an e-book reader, a desktop PC, a laptop PC, a netbook PC, a personal digital assistant (PDA), a portable multimedia player (PMP), an MP3 player, a mobile medical device, a camera, a wearable device (e.g., a head-mounted device (HMD)), electronic clothes, an electronic bracelet, an electronic necklace, an electronic appcessory, an electronic tattoo, or a smart watch.

According to various embodiments of the disclosure, the electronic device may be a smart home appliance with a communication function. For example, the smart home appliance may be a television, a digital video disk (DVD) player, an audio player, a refrigerator, an air conditioner, a vacuum cleaner, an oven, a microwave oven, a washer, a drier, an air cleaner, a set-top box, a TV box (e.g., Samsung HomeSync™, Apple TV™, or Google TV™), a gaming console, an electronic dictionary, a camcorder, or an electronic picture frame.

According to various embodiments of the disclosure, the electronic device may be a medical device (e.g., magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device, a gyroscope, or a compass), an aviation electronic device, a security device, or a robot for home or industry.

According to various embodiments of the disclosure, the electronic device may be a piece of furniture with a communication function, part of a building/structure, an electronic board, an electronic signature receiving device, a projector, or various measurement devices (e.g., devices for measuring water, electricity, gas, or electromagnetic waves).

According to various embodiments of the disclosure, an electronic device may be a combination of the above-listed devices. It should be appreciated by one of ordinary skill in the art that the electronic device is not limited to the above-described devices.

As follows are some embodiments of the disclosure. An embodiment may be intended for simultaneously operating several types of eMBB services such as instant messaging, video streaming, or social media services. Such embodiment may work when exchanging universal subscriber identification module (USIM) cards or when receiving back 5G services leaving out of non-service areas, e.g., a subway station. In this case, the mobile device may boot up within a shorter time by reducing the PDU session establishment of multiple background applications. Another embodiment involves using a mobile device that receives multiple eMBB services and one V2X CriC service in a car that is moving. Upon passing through a non-service area, such as a tunnel, or resuming the mobile device in the car, e.g., for exchanging batteries, the UE is allowed to receive a V2X service including information related to the traveling route earlier than the other services. Yet another embodiment involves the case where an IoT device connects to two PDU sessions, one for supporting an mIoT service such as eHealth or eFarm and the other for supporting a CriC service for remotely controlling robots. In this circumstance, the connection may be dropped due to, e.g., battery issues. In this case, the remote control may be freed from any problems by allowing the IoT device to receive back the CriC service as soon as possible.

Figure 2:
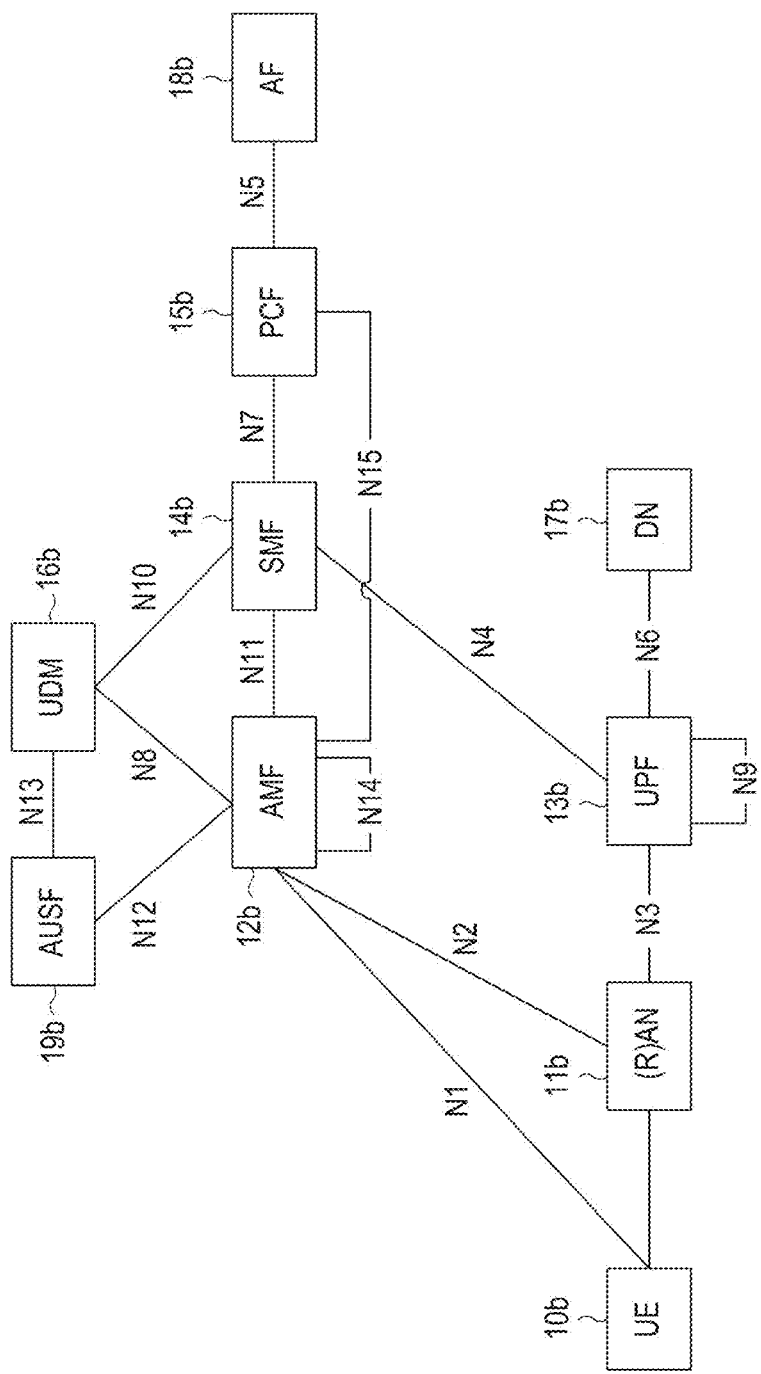

FIGS. 1 and 2, respectively, illustrate a 5G system architecture and a non-roaming 5G system architecture represented with reference points.

Referring to FIGS. 1 and 2, a 5G system architecture may include a user equipment (UE), a radio access network (RAN), and a plurality of network functions (NFs) inside a data network (DN) and a core network (CN) which are network components. As shown in FIGS. 1 and 2, in the 5G system architecture, functions, connection points, or protocols may be defined for the plurality of NFs. The 5G system structure may be shown with reference points indicating service-based interfaces corresponding to the NFs and reference points indicating interactions present among the NFs.

The plurality of NFs may include an authentication server function (AUSF), a core access and mobility management function (AMF), a network exposure function (NEF), a network function repository function (NRF), a policy control function (PCF), a session management function (SMF), a unified data management (UDM), a user plane function (UPF), and an application function (AF). Among others, in this disclosure, the AMF 12a or 12b, the SMF 14a or 14b, the PCF 15a or 15b, and the UPF 13a or 13b are referred to as protocol data units requested by the UE ("UE-requested PDUs"). The plurality of NFs may play a core role in managing UE10a10b-CN traffic.

The plurality of reference points may include an NAMF 12a or 12b (service-based interface exhibited by AMF(12a, 12b)), an NSMF 14a or 14b (service-based interface exhibited by SMF(14a,14b)), an NNEF (service-based interface exhibited by NEF(1)), an NPCF 15a or 15b (service-based interface exhibited by PCF(15a,15b)), an NUDM 16a or 16b (service-based interface exhibited by UDM(16a,16b)), an NAF18a or 18b (service-based interface exhibited by AF(18a,18b)), an NNRF (service-based interface exhibited by NRF(2)), an NAUSF 19a or 19b (service-based interface exhibited by AUSF(19a,19b)), an N1 (reference point between the UE(10a,10b) and the AMF(12a,12b)), an N2 (reference point between the (R)AN(11a,11b) and the AMF (12a,12b)), an N3 (reference point between the (R)AN(11a, 11b) and the UPF(13a,13b)), an N4 (reference point between the SMF(14a,14b) and the UPF(13a,13b)), an N6 (reference point between the UPF(13a,13b) and a data network (17a, 17b)), and an N9 (reference point between two core UPF (13a,13b)s).

The components are described below one by one.

The UE 10a or 10b—user equipment—may be implemented in various forms. For example, as disclosed herein, the UE may be, e.g., a mobile phone, a smartphone, a laptop computer, a digital broadcast terminal, a portable digital assistant (PDA), a portable media player (PMP), or a navigation device. As disclosed herein, the UE 10a or 10b may include an electronic device. The reference point between the UE 10a or 10b and the AMF 12a or 12b is defined as N1.

The (R)AN 11a or 11b represents a base station that uses new radio access technology (RAT). For example, the AN 11a or 11b may be a typical base station adopting non-3GPP access technology, e.g., wireless-fidelity (Wi-Fi). The reference point between the AN 11a or 11b and the AMF 12a or 12b is defined as N2, and the reference point between the AN and the UPF 13a or 13b is defined as N3.

The DN 17a or 17b may deliver PDUs, which are to be sent on downlink, to the UPF 13a or 13b or receive PDUs from the UE 10a or 10b via the UPF 13a or 13b. The reference point between the DN 17a or 17b and the UPF 13a or 13b is defined as NG6.

The AMF 12a or 12b provides access and mobility management functionality to manage the access and mobility independently of access technology, i.e., per UE 10a or 10b. The reference point between the AMF 12a or 12b and the UE 10a or 10b is defined as N1. The reference point between the AMF 12a or 12b and the AN is defined as N2. The reference point between the AMF 12a or 12b and the UDM 16a or 16b is defined as N8. The reference point between the AMF 12a or 12b and the AUSF 19a or 19b is defined as N12. The reference point between the AMF 12a or 12b and the SMF 14a or 14b is defined as N11.

The SMF 14a or 14b provides session management functionality in which, where one UE 10a or 10b has several sessions, a different SMF 14a or 14b is assigned per session to manage the sessions. For example, the UPF 13a or 13b is set up using control signal information produced by the SMF 14a or 14b. The NG4 reference point is defined for the UPF 13a or 13b to be able to report a state of the NG4 reference point to the SMF 14a or 14b. The reference point between the SMF 14a or 14b and the AMF 12a or 12b is defined as N11. The reference point between the SMF 14a or 14b and the UDM 16a or 16b is defined as N10. The reference point between the SMF 14a or 14b and the PCF 15a or 15b is defined as N7. The reference point between the SMF 14a or 14b and the AMF 12a or 12b is defined as N11.

For example, each UE 10a or 10b may connect to one AMF 12a or 12b. For the SMF 14a or 14b, one UE 10a or 10b may have several sessions, and thus, a different SMF 14a or 14b may be provided for each session.

The AF 18a or 18b may provide information about the flow of packets to the PCF 15a or 15b responsible for policy control to ensure the quality of service (QoS), and based thereupon, the PCF 15a or 15b may determine a policy for, e.g., session management or mobility management and deliver the policy to the AMF 12a or 12b or the SMF 14a or 14b, achieving mobility, session, and QoS management in a proper way. The reference point between the AF 18a or 18b and the PCF 15a or 15b is defined as N5.

The AUSF 19a or 19b stores data for authenticating the UE 10a or 10b, and the UDM 16a or 16b stores the user's subscription data or policy data. The reference point between the AUSF 19a or 19b and the UDM 16a or 16b is defined as N13. The reference point between the AUSF 19a or 19b and the AMF 12a or 12b is defined as N12. The reference point between the UDM 16a or 16b and the AMF 12a or 12b is defined as N8. The reference point between the UDM 16a or 16b and the SMF 14a or 14b is defined as N10.

The CP functions may include various functions to control the network and UE. As two representative functions, the UE 10a or 10b, the (R)AN 11a or 11b, the UPF 13a or 13b, the AMF 12a or 12b, the AF 18a or 18b, and the DN 17a or 17b in charge of mobility management functionality and the SMF 14a or 14b in charge of session management functionality are two independent functions and included in the CP functions.

The 5G system of FIG. 2 may lack the NEF 1 and the NRF 2 of FIG. 1 because such NFs may interwork with the NFs of FIG. 2 as necessary.

The operations among the UE 10a or 10b, the (R)AN 11a or 11b, the AMF 12a or 12b, the UPF 13a or 13b, the SMF 14a or 14b, the PCF 15a or 15b, the UDM 16a or 16b, and the DN 17a or 17b in the 5G system shown in FIG. 2 are sequentially described below.

Fig. illustrates a UE-requested single PDU session establishment for a non-roaming scenario.

The 5G system supports a PDU connection service, i.e., a service for exchanging PDUs between the UE 10a or 10b and the DN 17a or 17b identified by the DNN.

The PDU connection service supports a PDU session established at a request from the UE 10a or 10b. In other words, the PDU session means association between the UE 10a or 10b and the data network that provides the PDU connection service.

In this case, each PDU session supports a single PDU session type. In other words, upon establishing the PDU session, exchanging single-type PDUs requested by the UE 10a or 10b is supported. The following types of PDU sessions may be defined as IPv4, IPv6, ethernet, and unstructured.

Meanwhile, PDU session establishment may be triggered for the UE 10a or 10b which is in the CM-IDLE state to access the DN 17a or 17b to remotely communicate with a server in the 5G system.

Establishing a PDU session comes with two types of session establishing procedures; a UE (10a or 10b)-initiated (or UE-requested) PDU session establishment procedure and a network-initiated (or network-requested) PDU session establishment procedure.

The UE-initiated PDU session establishment procedure regards the case where the UE 10a or 10b desires to establish a connection with the DN 17a or 17b for later data exchange.

For example, a PDU session is established when requested by the UE 10a or 10b using signaling of non-access stratum (NAS) SMs that are exchanged through N1 between the UE 10a or 10b and the SMF 14a or 14b, modified when requested by the UE 10a or 10b and 5GC, and released when requested by the UE 10a or 10b and 5GC.

The network-initiated PDU session establishment procedure regards the case where a PDU session is established as the network sends out a trigger message to a relevant application of the UE 10a or 10b.

For example, the network transmits a device trigger message to an application of the UE 10a or 10b. The trigger payload contained in the device trigger request message contains information predicted for the application of the UE 10a or 10b to trigger a PDU session establishment request. Based on the information, the application of the UE 10a or 10b triggers the PDU session establishment procedure.

Further, as per a request from the application server, 5GC may trigger a particular application program of the UE 10a or 10b. Upon receiving the trigger message, the UE 10a or 10b needs to transfer the same to an application identified in the UE 10a or 10b, and the application program identified in the UE 10a or 10b may establish a PDU session for a particular DN(17a,17b)N.

Figure 3A:
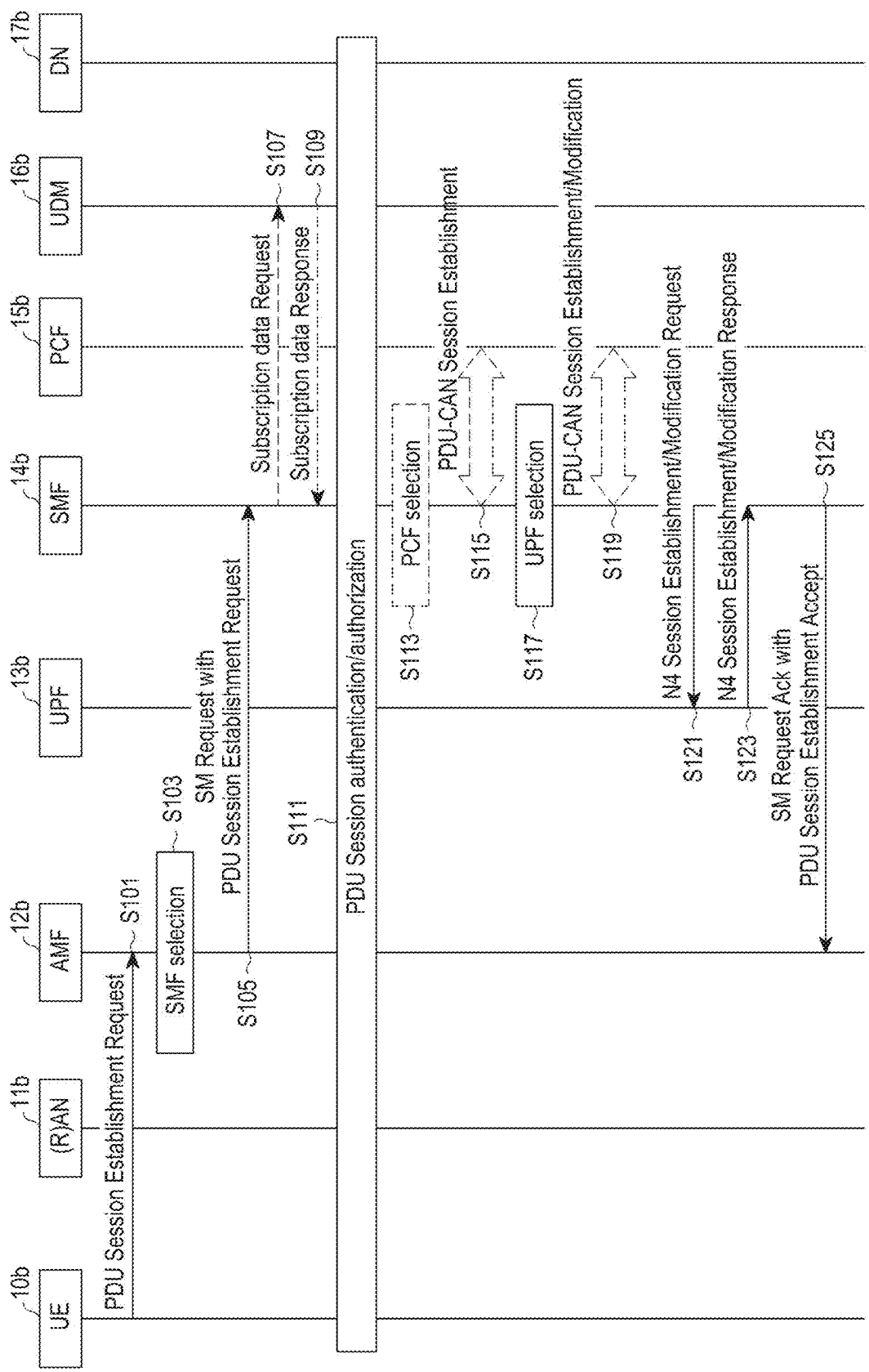
FIGS. 3A and 3B illustrate a UE-requested single PDU session establishment for a non-roaming scenario.
Figure 3B:
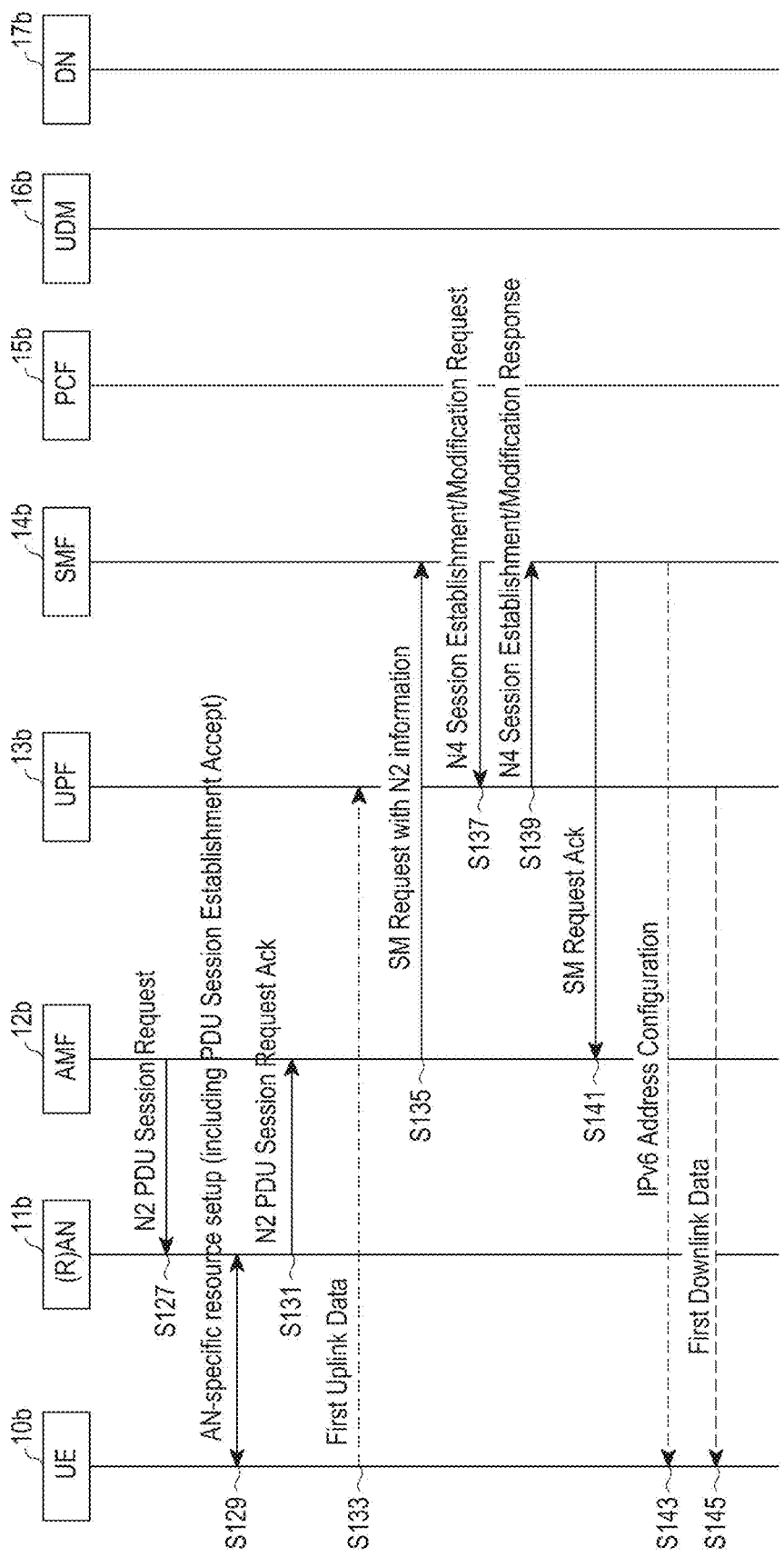

As shown in FIGS. 3A and 3B, a single PDU session establishing method is performed by the AMF 12b, the UDM 16b, the SMF 14b, the PCF 15b, and the UPF 13b, as the NFs participating in the PDU session establishment process inside the CN, the DN 17b, the (R)AN 11b, and the UE 10b which are network components.

Simply speaking, when the SMF 14b receives a PDU session establishment request message from the UE 10b (operations 103 to 105), the SMF 14b identifies whether the received request is valid (operations 107 to 109), connects to the NF, in the CN, related to the PDU session (operations 111 to 123), and then transfers information about the established session to the UE 10b (operations 125 to 131). As necessary, the UE 10b additionally sends out a PDU session establishment complete message. In this case, the AMF 12b, the SMF 14b, and the UPF 13b perform additional processes. In the case of PDU type IPv6, the SMF 14b sends an IPv6 router advertisement message to the UE 10b (operations 135 to 143). For reference, the selection of the PCF 15b in operation 113 is determined depending on adopting a dynamic policy and charging control (PCC).

In operation 101, the UE 10b sends a PDU session establishment request message to the AMF 12b.

For example, the UE 10b may transmit a NAS message to the AMF 12b. The NAS message may include at least one or more of single network slice selection assistance information (S-NSSAI), data network name (DNN), PDU session ID, request type, or N1 SM information.

In this case, the NAS message may include the PDU session establishment request message.

Further, the NAS message sent out by the UE 10bb may be encapsulated by the AN 11b in the form of an N2 message towards the AMF 12b that may have user location information and access scheme type information. In this case, the AMF 12b may receive a NAS SM message along with the user location information (e.g., cell ID in the case of RAN) from the AN 11b.

To establish a new PDU session, the UE 10b may generate a new PDU session ID.

The request type may indicate "initial request" where the request for establishing a PDU session is for establishing a new PDU session or "existing PDU session" where the request is for establishing an existing PDU session between 3GPP access and non-3GPP access.

The N1 SM information may include an SM PDU DN request container that contains information about assigning a PDU session authority by an external DN 17b.

Accordingly, the UE 10b initiates a UE-requested PDU session establishment procedure by sending out a NAS message containing a PDU session establishment request in the N1 SM information. The PDU session establishment request may include PDU type, service and session continuity (SSC) mode, and protocol configuration option.

In operation 103, the AMF 12b selects the SMF 14b.

For example, where the request type of the NAS message corresponding to a request for a new PDU session is "initial request," the AMF 12b may determine that the PDU session ID is not used for the existing PDU session of the UE 10b.

Where the NAS message lacks S-NSSAI, the AMF 12b may determine default S-NSSAI for the PDU session requested as per UE (10b) subscription.

The AMF 12b may select the SMF 14b.

The AMF 12b may store an association between the PDU session ID and the SMF (14b) ID.

Further, where the request type is "existing PDU session" and the AMF 12b fails to recognize the PDU session ID or the SMF (14b) ID corresponding to the DN (17b)N is not included in the subscription context of the UDM 16b, an error may occur.

Meanwhile, the SMF (14b) selection function is supported by the AMF 12b and is used to assign the SMF 14b to manage PDU sessions.

Further, where the SMF 14b is unavailable, the SMF (14b) selection function of the AMF 12b may utilize the network repository function to discover SMF instance(s) and this is locally configured in the AMF 12b. The NRF provides the IP address or FQDN of the SMF (14b) instance to the AMF 12b.

The SMF (14b) selection function in the AMF 12b is applicable to both 3GPP access and non-3GPP access.

Further, when the AMF 12b selects the SMF 14b, DNN, S-NSSAI, subscription information of the UDM 16b, local operator policies, load conditions of the candidate SMFs, and such elements may be taken into account.

For example, where the UE 10b has an existing PDU session for the same DNN and S-NSSAI as that used in inducing the SMF 14b, the same SMF 14b may be selected.

In operation 105, the AMF 12b transmits an SM request containing a PDU session establishment request to the SMF 14b.

For example, the SM request may include at least one or more of subscriber permanent ID, DNN, S-NSSAI, PDU session ID, AMFID, N1 SM information, user location information, access scheme type, or PEI. The N1 SM information may contain PDU session ID and a PDU session establishment request.

The AMF 12b uniquely identifies the AMF 12b that serves the UE 10b.

The N1 SM information may contain PDU session ID and a PDU session establishment request. In this case, the PDU session establishment request may be received from the UE 10b.

The permanent equipment identifier (PEI) defines 3GPP UEs accessing a 5G system. The PEI may take different forms depending on various UE types and use examples. The UE needs to give the PEI to the network while indicating the type of the PEI in use. Where the UE supports at least one 3GPP access scheme, the UE needs to be assigned the PEI in the IMEI format. Within this scope of the release, the unique format supported in the PEI medium variable is the IMEI.

In operation 107, the SMF 14b transmits a subscription data request to the UDM 16b.

The subscription data request contains subscriber permanent ID and DNN information.

Where the request type indicates "existing PDU session" in operation 105, the SMF 14b may determine that the request is one resulting from handover between 3GPP access and non-3GPP access. The SMF 14b identifies the existing PDU session based on the PDU session ID.

Where the SMF 14b has yet to obtain the SM-related subscription data for the UE 10b related to the DNN, the SMF 14b may send a request for subscription data to the UDM 16b.

In operation 109, the UDM 16b transmits a subscription data response to the SMF 14b.

The subscription data contains the authenticated PDU type, authenticated SSC mode, and default QoS profile.

The SMF 14b checks whether the UE (10b) request is compatible with the user subscription and local policies. Unless compatible, the SMF 14b may reject the UE (10b) request by the NAS SM signaling (containing the relevant reason for the SM rejection) transmitted by the AMF 12b, and the SMF 14b may notify the AMF 12b to release the PDU session ID and to skip the remaining procedures.

In operation 111, the SMF 14b performs authorization/authentication to establish a PDU session.

Where the SMF 14b needs to authorize/authenticate PDU session establishment, the SMF 14b selects the UPF 13b, and triggers the authorization/authentication to establish a PDU session.

Where authenticating/assigning an authority to establish a PDU session fails, the SMF 14b terminates the PDU session establishment procedure and indicates the rejection to the UE 10b.

In operation 113, when the dynamic PCC is distributed, the SMF 14b performs the selection of the PCF 15b.

In operation 115, the SMF 14b starts to establish a PDU-CAN session for the PCF 15b to obtain the default PCC rule for PDU sessions. Where the request type in operation 105 indicates "existing PDU session," the PCF 15b may perform PDU-CAN session modification.

In operation 117, the SMF 14b selects the UPF 13b.

Where the request type in operation 105 is "initial request," the SMF 14b selects the SSC mode for the PDU session.

Unless operation 111 is performed, the SMF 14b selects the UPF 13b. For example, where the PDU type is IPv4 o IPv6, the SMF 14b may assign the IP address/prefix for the PDU session. In the case of the non-structural PDU type, the SMF 14b may assign a (UDP/IPv6-based) tunneling between the N6 point and the IPv6 prefix for the PDU session.

In operation 119, where dynamic PCC rules are distributed and PDU-CAN session establishment is not complete yet, the SMF 14b starts to establish a PDU-CAN session towards the PCF 15b to obtain a default PCC rule for the PDU session. Otherwise, where the request type is "initial request," dynamic PCC rules are distributed, and the PDU type is IPv4 or IPv6, the SMF 14b may start PDU-CAN session modification and provide the assigned UEIP address/prefix to the PCF 15b.

In operations 121 and 123, where the request type is "initial request" and operation 111 is not performed yet, the SMF 14b may start an N4 session establishment procedure with the UPF 13b and may otherwise start an N4 session modification procedure to the selected UPF 13b.

In operation 121, the SMF 14b transmits an N4 session establishment/modification request to the UPF 13b.

The SMF 14b may provide packet detection, enforcement, and reporting rules to be installed in the UPF 13b for this PDU session. When the SMF 14b assigns CN tunnel information, the CN tunnel information may be provided to the UPF 13b in operation 121.

In operation 123, the UPF 13b transmits an N4 session establishment/modification response to the SMF 14b.

When the CN tunnel information is assigned by the UPF 13b, the CN tunnel information is provided to the SMF 14b in operation 123.

In operation 125, the SMF 14b transmits an SM response containing a PDU session establishment acceptance to the AMF 12b.

The SM response contains the cause, N2 SM information, and N1 SM information.

The N2 SM information contains information that the AMF 12b needs to send to the (R)AN.

For example, the N2 SM information may contain the PDU session ID, QoS profile, and CN tunnel information.

The PDU session ID may be used to indicate to the UE 10b the association between the PDU session and the AN resource for the UE 10b by AN signaling for the UE 10b.

The CN tunnel information contains the core network address of the N3 tunnel corresponding to the PDU session.

The QoS profile provides the (R)AN with mapping between the QoS parameters and the QoS flow identifiers. Multiple QoS profiles may be provided to the (R)AN.

The N1 SM information contains the PDU session establishment acceptance that the AMF 12b needs to provide to the UE 10b.

The N1 SM information contains the PDU session establishment acceptance information. For example, the PDU session establishment acceptance information may contain an authorized QoS rule, SSC mode, S-NSSAI, and assigned IPv4 address.

A plurality of authorized QoS rules may be contained in the PDU session establishment acceptance of the N1 SM information and the N2 SM information.

Further, the SM response includes the PDU session ID and information allowing the AMF 12b to determine what UE is to be used for access, as well as the target UE.

In operation 127, the AMF 12b transmits an N2 PDU session request to the (R)AN 11b.

The N2 PDU session request contains N2 SM information and a NAS message. The NAS message may contain the PDU session ID and the PDU session establishment acceptance.

The AMF 12b may transmit the NAS message the PDU session ID and PDU session establishment acceptance to the UE 10b and may transmit the N2 SM information received from the SMF 14b in the N2 PDU session request to the (R)AN 11b.

In operation 129, the (R)AN 11b may exchange particular signals with the UE 10b related to the information received from the SMF 14b. For example, in the case of the 3GPP RAN 11b, a RRC connection reconfiguration may occur in which necessary RAN resources related to the authorized QoS rules for the PDU session request received in operation 125 are established with the UE 10b.

The (R)AN 11b may assign (R)AN N3 tunnel information for the PDU session.

Further, the (R)AN 11b may forward the NAS message (PDU session ID, N1 SM information (PDU session establishment acceptance)) provided in operation 125 to the UE 10b. The (R)AN 11b may provide a NAS message to the UE 10b only when necessary RAN resources are established and the assignment of (R)AN tunnel information succeeds.

To indicate that the PDU session has successfully established the PDU session for the core network, the UE 10b may send out a NAS PDU session establishment complete message.

In operation 131, the (R)AN 11b transmits an N2 PDU session request response to the AMF 12b.

The PDU session request response contains the PDU session ID, (R)AN (11b) tunnel information cause, and N2 SM information.

The N2 SM information may contain the PDU session ID, (R)AN tunnel information, and a list of accepted/rejected QoS profiles.

The (R)AN tunnel information corresponds to the access network address of the N3 tunnel corresponding to the PDU session.

In operation 135, the AMF 12b transmits an SM request containing the N2 SM information to the SMF 14b.

For example, the AMF 12b may deliver the N2 SM information received by the (R)AN 11b to the SMF 14b.

In operation 137, the SMF 14b transmits an N4 session establishment/modification request to the UPF 13b.

Unless an N4 session for the PDU session is established yet, the SMF 14b along with the UPF 13b may start an N4 session establishment procedure. Otherwise, the SMF 14b may start an N4 session modification procedure using the UPF 13b. The SMF 14b may provide (R)AN tunnel information and CN tunnel information. The CN tunnel information may be provided only when the SMF 14b selects the CN tunnel information in operation 119.

In operation 139, the UPF 13b transmits an N4 session establishment/modification response to the SMF 14b.

In operation 141, the SMF 14b transmits an SM request response to the AMF 12b.

After the operation, the AMF 12b may deliver a relevant event to the SMF 14b. For example, upon handover to change the (R)AN tunnel information or reposition the AMF 12b, the AMF 12b may deliver the relevant event to the SMF 14b.

Where the PDU type is IPv6 in operation 143, the SMF 14b generates an IPv6 router advertisement and transmits the same to the UE 10b via N4 and the UPF 13b.

Although not shown, unless the SMF ID is contained in the DNN subscription context by the UDM 16b in operation 109, the SMF 14b may invoke the "UF Register UENF" service by including the SMF (14b) address and DN(17b)N. The UDM 16b may store the SMF ID, address, and associated DN (17b)N.

Unless the PDU session establishment succeeds, the SMF 14b may notify the AMF 12b. When the AMF 12b associates the SMF 14b with the PDU session ID, the SMF 14b may automatically subscribe to the receiving N1 signaling notification related to this PDU session ID. Such notification may automatically provide any user location information and access type that the AMF 12b receives from the (R)AN in relation to N1 signaling.

Figure 4:
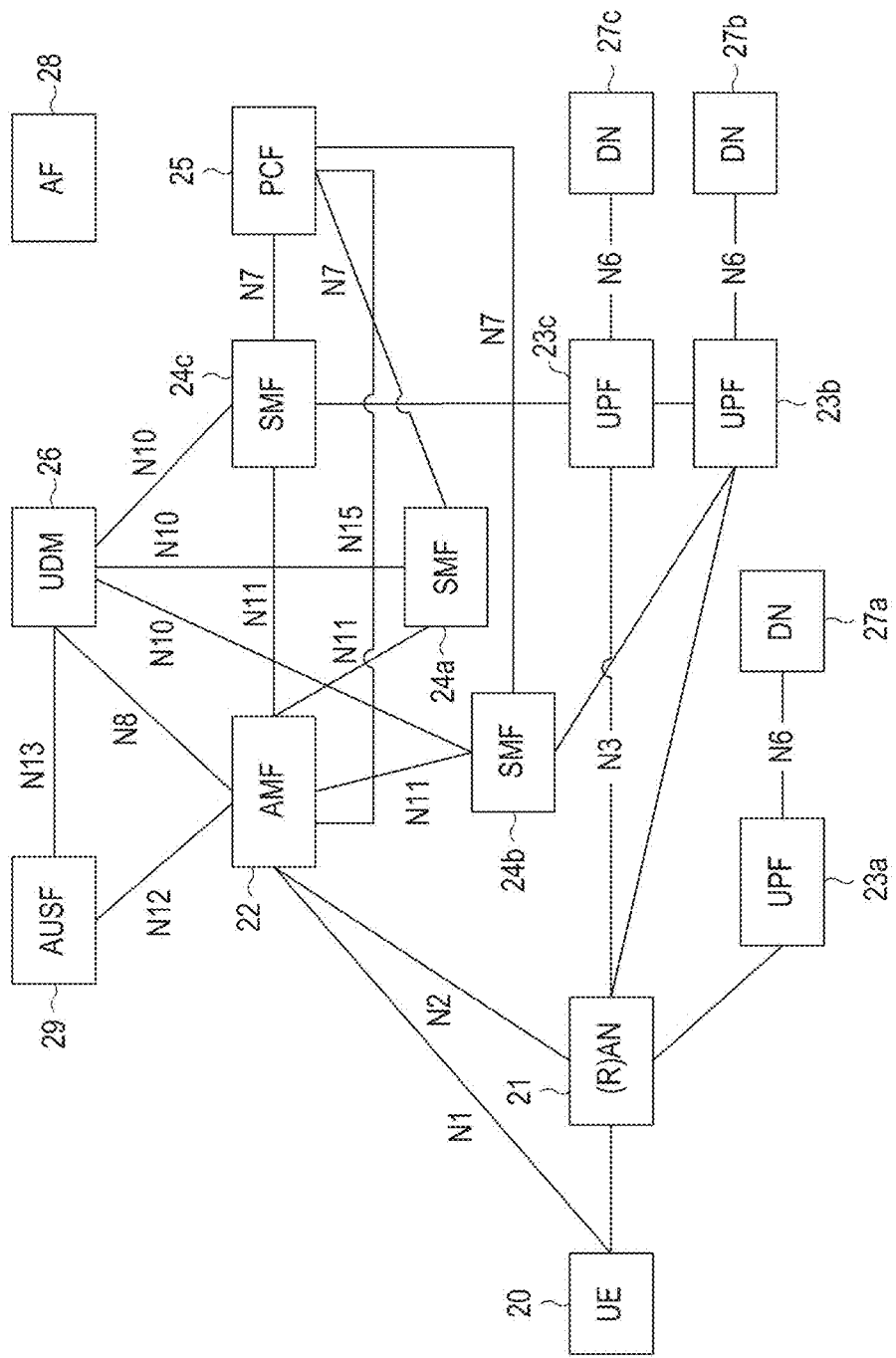
FIG. 4 illustrates a non-roaming 5G system architecture for a UE simultaneously accessing three DNs using three PDU sessions.

FIG. 4 illustrates a non-roaming 5G system architecture for a UE 20 simultaneously accessing three DNs 27a, 27b, and 27c using three PDU sessions.

The UE 20 may simultaneously establish multiple PDU sessions for the same or different DNs 27a, 27b, and 27c via a 3GPP and non-3GPP access network. Although not shown, the UE 20 may establish multiple PDU sessions for the same data network and may be served by different UPF (23a,23b, 23c) termination N6's.

As shown in FIG. 4, when the UE 20 simultaneously accesses three DNs 27a, 27b, and 27c via three PDU sessions, the PDU sessions for the UE 20 have SMFs 24a, 24b, and 24c in the control plane and UPFs 23a, 23b, and 23c in the user plane.

In other words, the UE 20 with multiple established PDU sessions may be served by different UPFs 23a, 23b, and 23c and different SMFs 24a, 24b and 24c. Further, for the UE 20 with multiple PDU sessions established using multiple UPFs 23a, 23b, and 23c, the SMFs 24a, 24b, and 24c may support independent activation of the UE-CN user plane connection per PDU session. At this time, the paths along which traffic in different PDU sessions is delivered from the (R)AN 21 to the UPFs 23a, 23b, and 23c are disjointed.

Meanwhile, each PDU session may be connected to the network slice for a particular service. Per service with different requirements, a separate network slice (NS) may be created, and the network functions (NFs) may be present in different locations per network slice.

For example, a first PDU session may correspond to a slice for an eMBB service, and a second PDU session may correspond to a slice for a V2X service.

At this time, the paths along which traffic in different PDU sessions is delivered from the (R)AN 21 to the UPFs 23a, 23b, and 23c are disjointed.

Meanwhile, as shown in FIG. 4, one PCF 25a, 25b, or 25c is connected to three SMFs 24a, 24b, and 24c, and it is unclear whether dynamic PCC is introduced.

The UE 20 may send a request to move the PDU session between 3GPP access and non-3GPP access. Moving the PDU session between 3GPP access and non-3GPP access is determined per PDU session. In other words, the UE 20 may have some PDU sessions that use 3GPP access in a given time, and other PDU sessions may use non-3GPP access.

In the PDU session establishment request transmitted to the network, the UE 20 may provide the PDU session ID, PDU session type, slicing information, DNN, and SCC mode as defined in 5.3.2.

The operations among the UE 20, the (R)AN 21, the AMF 22, the UPFs 23a, 23b, and 23c, the SMFs 24a, 24b, and 24c, the PCFs 25a, 25b, and 25c, the UDM 26, and the DNs 27a, 27b, and 27c in the 5G system shown in FIG. 4 are sequentially described below.

Figure 5A:
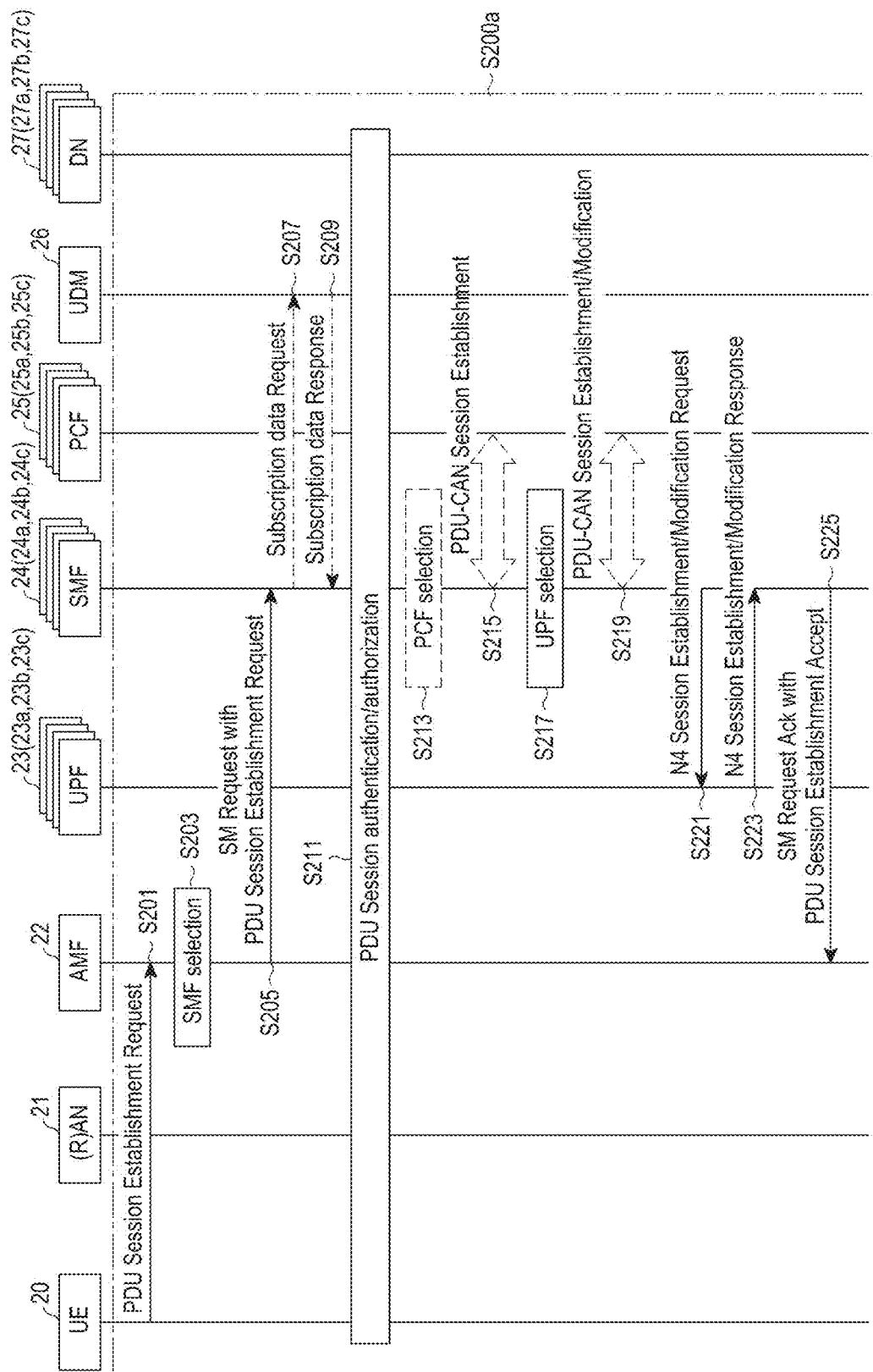
FIGS. 5A and 5B illustrate a method for establishing three PDU sessions.
Figure 5B:
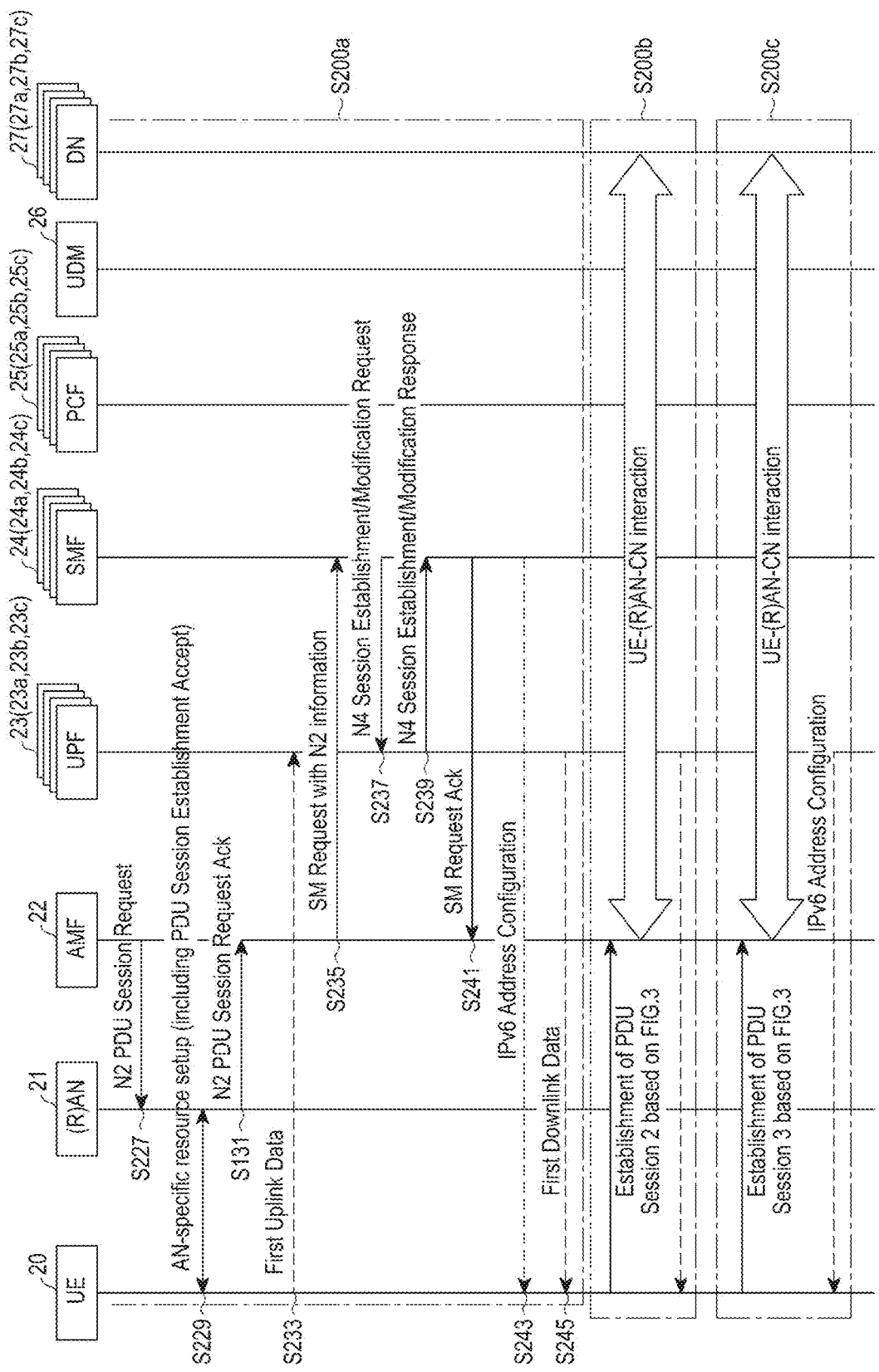

FIGS. 5A and 5B illustrate a method for establishing three PDU sessions.

FIGS. 5A and 5B illustrate a specific process of establishing three PDU sessions, considering adoption of the dynamic PCC of three PDU sessions as shown in FIGS. 3A and 3B.

When the UE 20 requests to establish multiple PDU sessions, each PDU session is independently established.

As shown in FIGS. 5A and 5B, the process of establishing three PDU sessions may encompass three operations 200a, 200b, and 200c that are performed sequentially.

In this case, operation 200a may include a process for establishing a first PDU session, operation 200b may include a process for establishing a second PDU session, and operation 200c may include a process for establishing a third PDU session.

Further, operation 200a, operation 200b, and operation 200c may include interactions among the SMFs 24a, 24b, and 24c, the PCFs 25a, 25b, and 25c, and the UPFs 23a, 23b, and 23c, and each operation is the same as the single PDU session establishment process described above in connection with FIG. 5A.

Since operations 201 to 245 of operation 200a correspond to operations 101 to 145 of FIGS. 3A and 3B, no detailed description thereof is given below. Likewise, operations 200b and 200c correspond to operations 101 to 145 of FIGS. 3A and 3B.

As set forth above, a process for establishing multiple PDU sessions is performed by simply repeating each PDU session establishment process.

For example, requesting to establish multiple PDU sessions is to repeatedly request to establish each PDU session. The interactions among the NFs in the process of establishing multiple PDU sessions are repeating the interactions among the SMFs 24a, 24b, and 24c, the PCFs 25a, 25b, and 25c, and the UPFs 23a, 23b, and 23c in the respective corresponding PDU sessions.

In other words, the number of interactions necessary between the UE 20 and the CN in the process of establishing multiple PDU sessions linearly increases as per the number of PDU sessions requested, and the NFs, such as the AMF 22, the SMFs 24a, 24b, and 24c, and the UDM 26, repeat the same data exchange process.

Where applications for providing various services request to establish each PDU session in the 5G system, each PDU session may be connected to the network slice for a particular service.

Per service with different requirements, a separate network slice (NS) may be created, and the network functions (NFs) may be present in different locations per network slice.

For example, the applications may include an instant message (IM), social media (SNS), and V2X service application, and the IM and the SNS may be classified as eMBB services, and the V2X may be classified as a CriC service.

In this case, where the social media (SNS) application requests to establish a PDU session, the PDU session may be connected to the network slice (NS) for eMBB services.

Further, where the vehicle to X (V2X) application requests to establish a PDU session, the PDU session may be connected to the NS for CriC services. The CriC service may denote a service in which data latency is low, i.e., a delay critical service.

Figure 6:
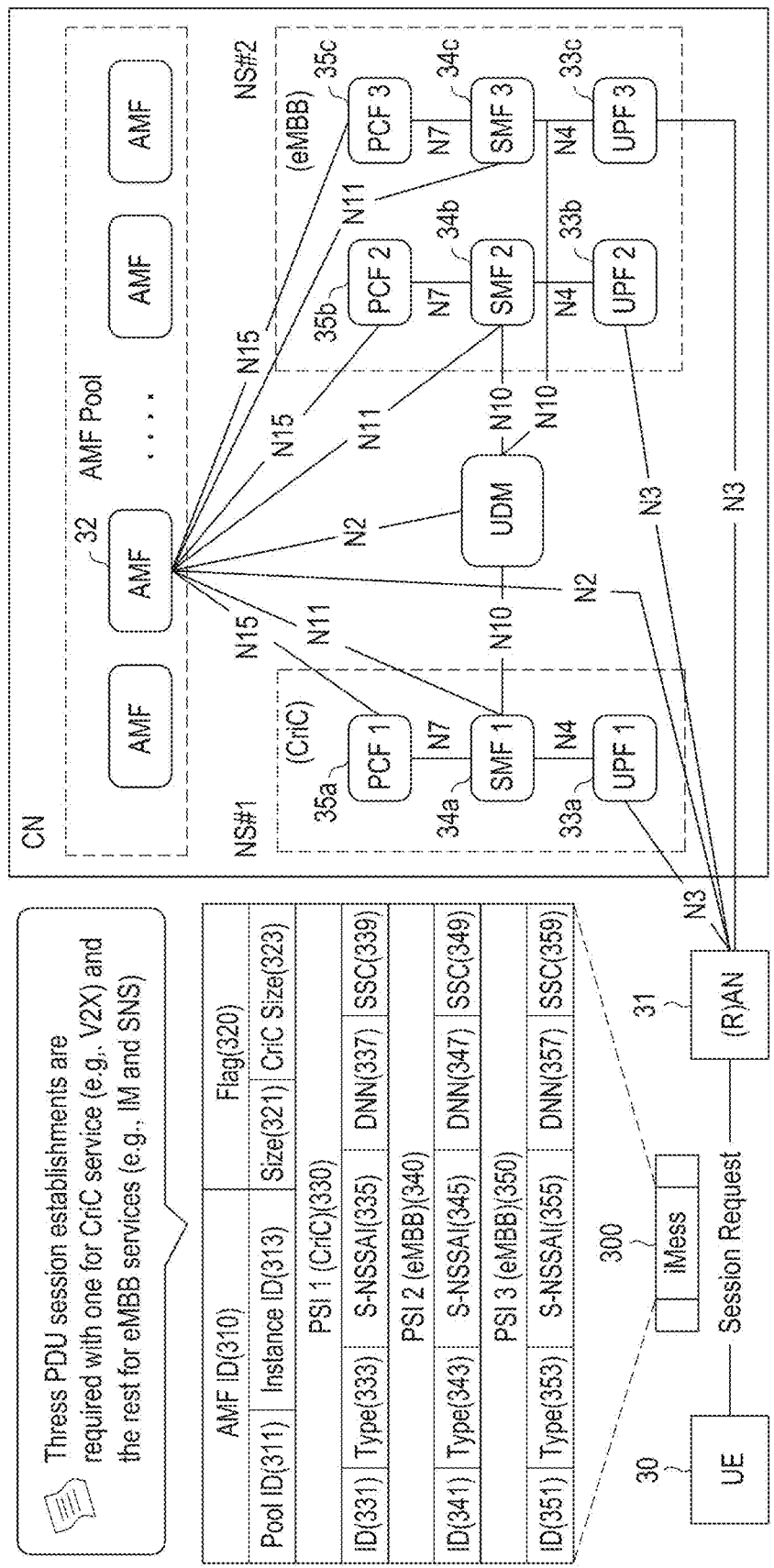
FIG. 6 illustrates a 5G system architecture for establishing a plurality of PDU sessions using an indicator (iMess) representing a request for establishing a plurality of PDU sessions in a 5G system.

FIG. 6 illustrates a 5G system architecture for establishing a plurality of PDU sessions using an indicator (iMess) representing a request for establishing a plurality of PDU sessions in a 5G system according to an embodiment.

According to the disclosure, a brand-new indicator for multiple PDU session establishment (iMess) may be adopted.

As shown in FIG. 6, the iMess 300 may include an AMF ID 310, a flag 320, and public service identities (PSIs) 330, 340, and 350.

The AMF ID 310 includes two fields; AMFPool ID 311 and AMF Instance ID 313.

The (R)AN 31, upon receiving the AMF instance ID 313 from the UE 30, may deliver a PDU session establishment request message to the AMF 32 corresponding to the AMF instance ID 313. Meanwhile, unless the UE 30 provides the AMF instance ID 313, the (R)AN 31 may discover the available AMF 32 based on the AMFPool ID 311, assign the AMF 32 to the UE 30, and deliver a PDU session establishment request message to the AMF 32.

The Flag 320 includes two fields; size 321 and CriC size 323.

The size 321 means a total number of the plurality of PDU sessions contained in the iMess 300, and the CriC size 323 means the number of PDU sessions corresponding to the CriC service requiring immediate PDU session establishment among the plurality of PDU sessions. This is described below in greater detail with reference to FIGS. 7 and 8.

The PSIs 330, 340, and 350 are used to specify detailed information about the PDU session request. The PSIs includes PDU session ID fields 331, 341, and 351, PDU session type fields 333, 343, and 353, single network slice selection assistance information (S-NSSAI) fields 335, 345, and 355, data network name (DNN) fields 337, 347, and 357, service and session continuity (SSC) fields 339, 349, and 359.

When the UE 30 desires to reuse the UE 30's prior possessing PDU session, the information used in the prior PDU session may be written in the PSI field. Meanwhile, when the UE 30 desires to establish a new PDU session, the UE 30 may only signify the S-NSSI value to allow the CN to establish a PDU session.

As shown in FIG. 6, the iMess 300 may include three PSIs 330, 340, and 350 corresponding to three PDU sessions. The three PSIs may be sorted top to down corresponding to the order of establishing the plurality of PDU sessions.

For example, the PSI 330 corresponding to the CriC service requiring immediate PDU session establishment is positioned higher than the PSIs 340 and 350 corresponding to the eMBB or mIoT, so that the PDU session corresponding to the CriC service is given a higher priority than the PDU sessions corresponding to the eMBB or mIoT service. This is described below in greater detail with reference to FIGS. 7A, 7B, and 7C, and FIG. 8.

According to an embodiment, the UE 30 may transmit a PDU session establishment request message containing the iMess 300 to establish multiple PDU sessions to the (R)AN 31.

Typically in the 5G system, a separate network slice (NS) may be created per service with different requirements, and the network functions (NFs) may be present in different locations per network slice. In other words, the 5G system supports establishing multiple PDU sessions of several types, meaning that the PDU sessions have different SMFs 34a, 34b, and 34c and UPFs 33a, 33b, and 33c.

For example, as shown in FIG. 6, the UE 30 may establish three PDU sessions that include one PDU session connected to NS#1 corresponding to CriC services and two PDU sessions connected to NS#2 corresponding to eMBB services.

The PDU sessions may be established by signaling interactions among the NFs related to the UE 30, the (R)AN 31, and the AMF 32, i.e., the SMFs 34a, 34b, and 34c, the PCFs 35a, 35b, and 35c, and the UPFs 33a, 33b, and 33c.

The operations among the UE 30, the (R)AN 31, the AMF 32, the UPFs 33a, 33b, and 33c, the SMFs 34a, 34b, and 34c, the PCFs 35a, 35b, and 35c, the UDM 36, and the DNs 37a, 37b, and 37c in the 5G system shown in FIG. 6 are sequentially described below.

Figure 7A:
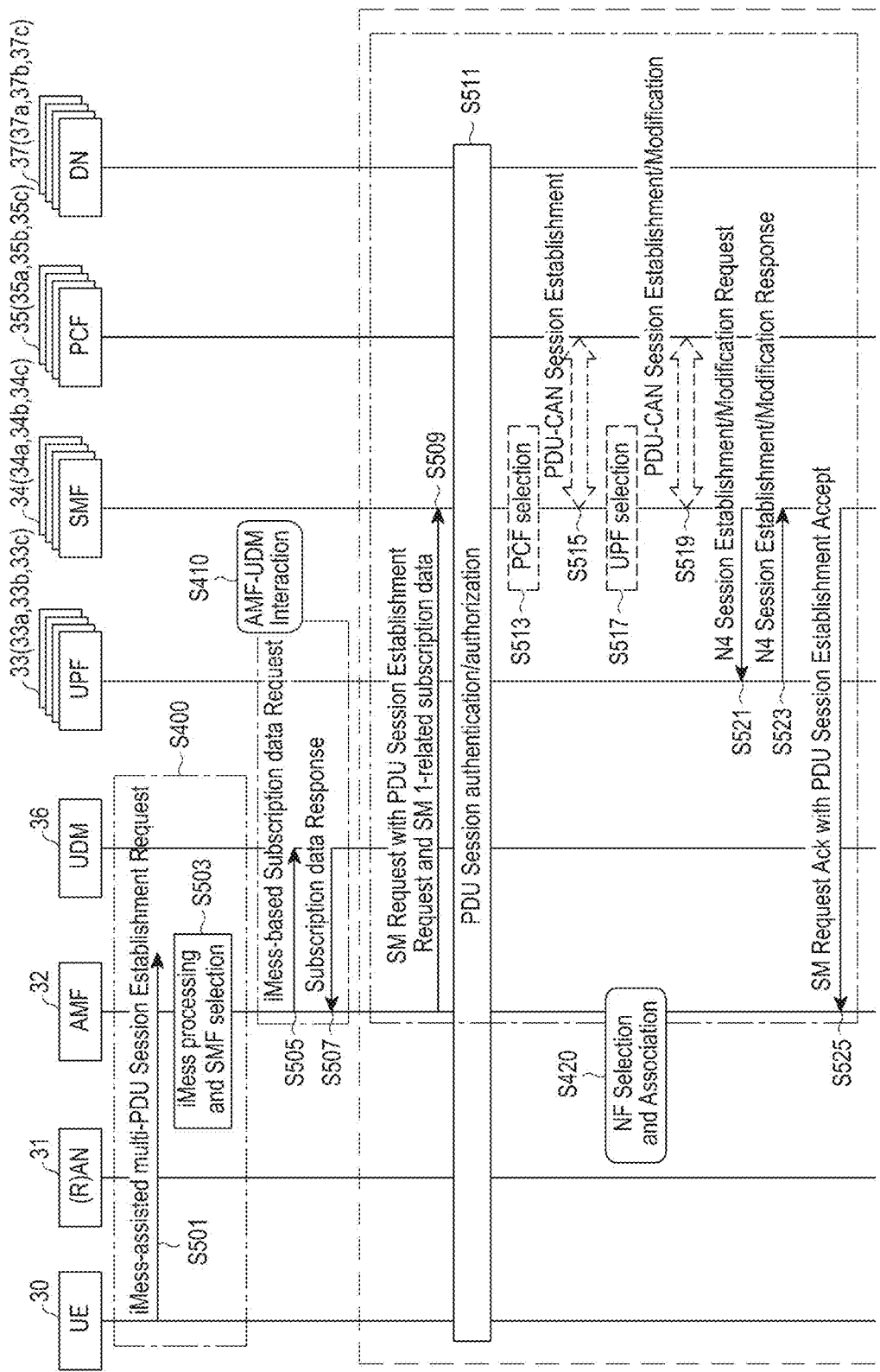
FIGS. 7A, 7B, and 7C illustrate a method for establishing a plurality of PDU sessions using an indicator (iMess) representing a request for establishing a plurality of PDU sessions in a 5G system.
Figure 7B:
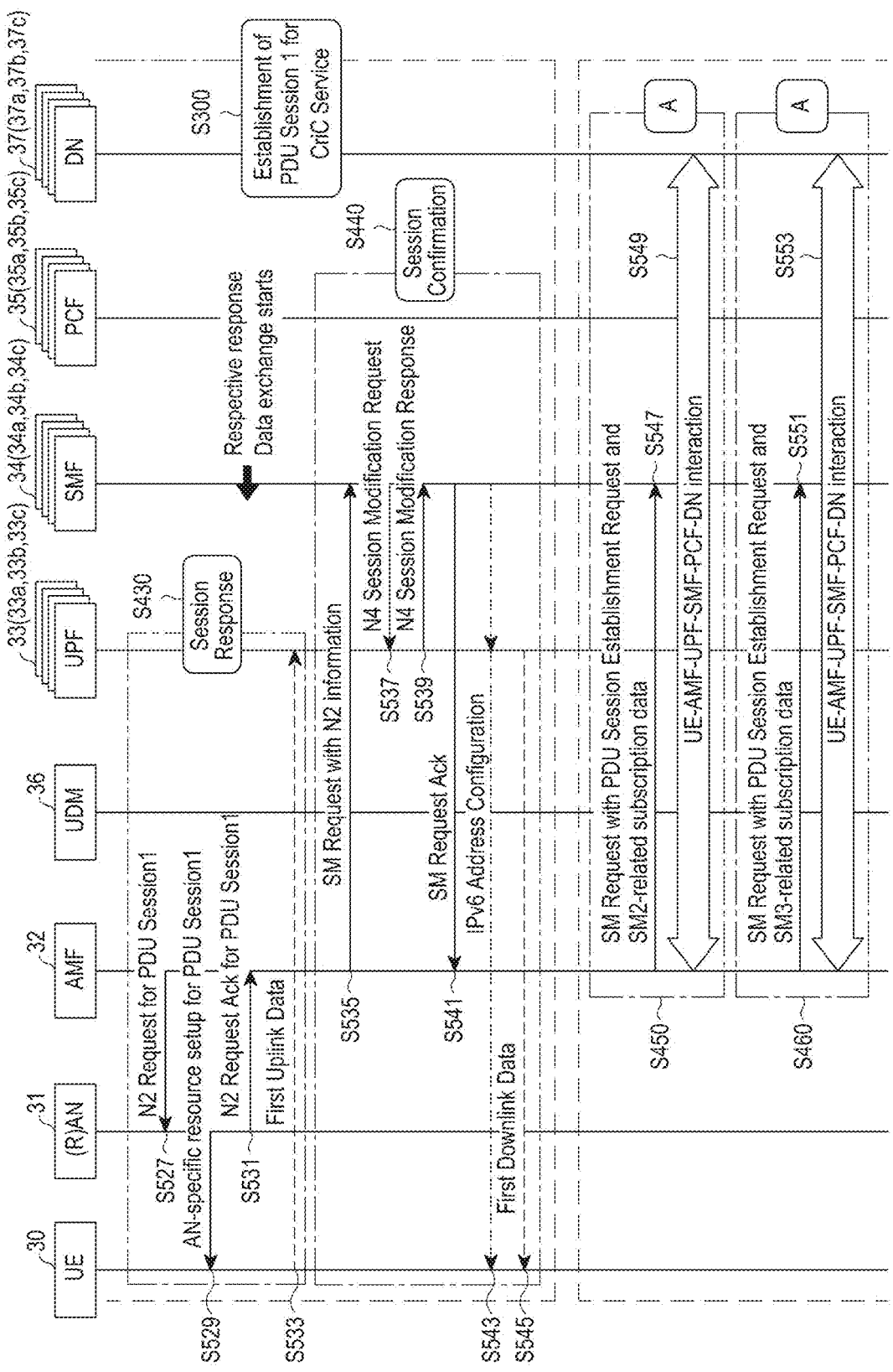
Figure 7C:
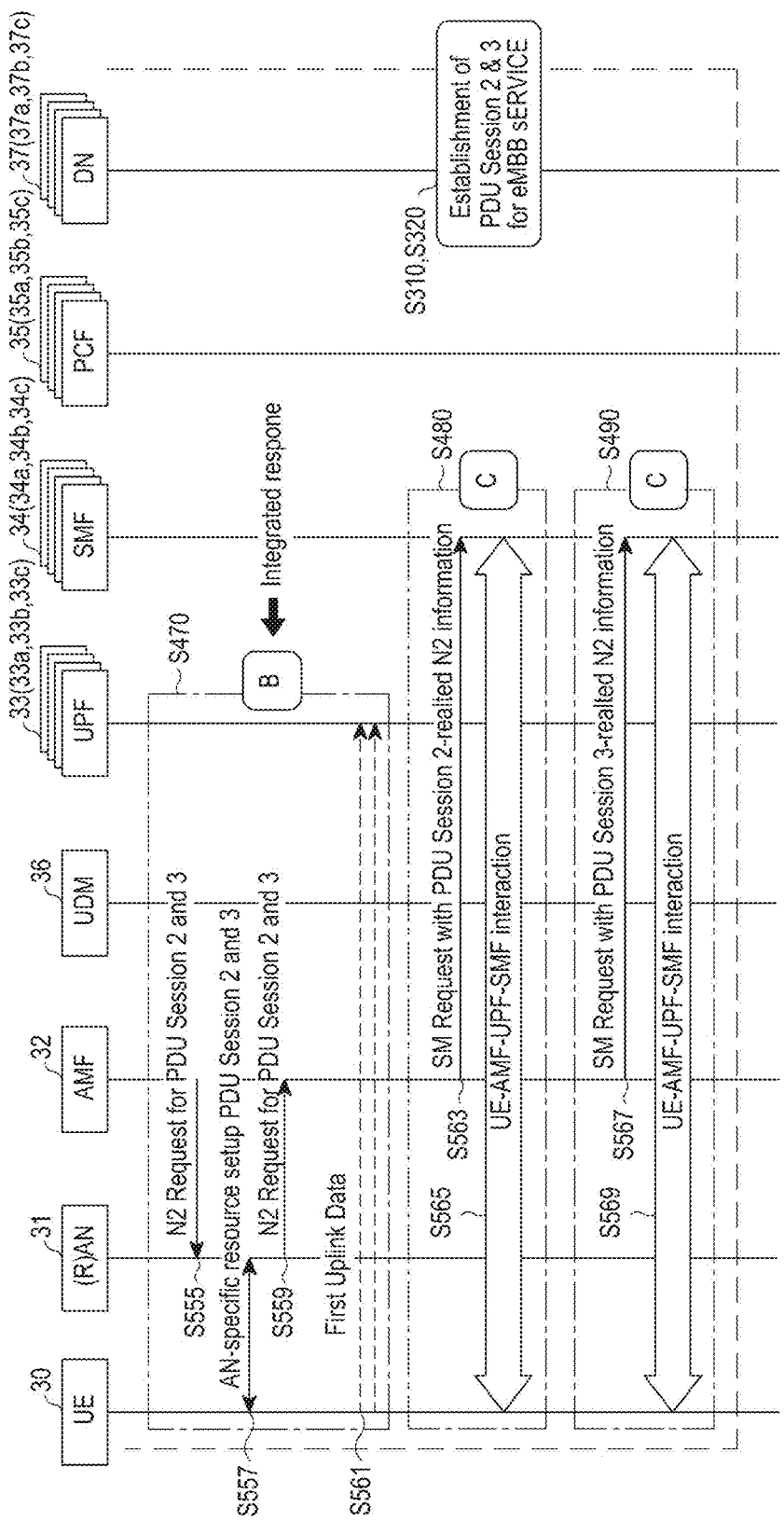

FIGS. 7a and 7B illustrate a flowchart of a method for establishing a plurality of PDU sessions using an indicator (iMess) representing a request for establishing a plurality of PDU sessions in a 5G system according to an embodiment.

As shown in FIGS. 7A and 7B, in establishing multiple PDU sessions, the process (operation 300) of establishing the first PDU session corresponding to CriC services sensitive to latency may be performed separately from and earlier than the processes (S310 and S320) of establishing the other PDU sessions.

For example, the other PDU session establishment processes S310 and S320 may include a second PDU session establishment process and a third PDU session establishment process. The second PDU session and the third PDU session may be PDU sessions corresponding to enhanced mobile broadband (eMBB) or massive internet of things (mIoT) services.

Simply speaking, the first PDU session establishment process (S300) corresponding to CriC services may include transmitting multiple PDU session establishment request messages to the AMF 32 based on the iMess (operation 400, interoperating between the AMF 32 and the UDM 36 (operation 410), NF selection and connection (operation 420), first PDU session responding (operation 430), and first PDU session confirming (operation 440).

The other PDU session establishment processes (operation 310 and operation 320) may include NF selection and connection (operation 450) in the second PDU session establishment process, NF selection and connection (operation 460) in the third PDU session establishment process, second PDU session and third PDU session responding (operation 470), second PDU session confirming (operation 480), and third PDU session confirming (operation 490).

Operation 400 may include a process (operation 501) in which the (R)AN 31 receives a PDU session establishment request containing the iMess 300 from the UE 30, refers to the AMF ID field 310 to select the existing AMF 32 or refers to the AMFPool ID 311 to assign a new AMF 32 to the UE 30 and a process (operation 502) in which the AMF 32 analyzes the field specified in the iMess 300 and selects the SMF 34a, 34b, or 34c appropriate for each PDU session as per the standards.

Operation 410 may include the processes (operations 505 and 507) in which the AMF 32 collectively and previously brings subscription data related to the UE 30 from the UDM 36. As shown in operations 107 to 109 of FIG. 3A, this case differs from where each selected SMF 34a, 34b, or 34c individually brings subscription data from the UDM 36.

In other words, in operation 410 of FIG. 7A, the AMF 32 may substitute for the SMF 34a, 34b, or 34c, collectively reading in subscription data from the UDM 36. Meanwhile, this process complies with the standards. This is why, according to the disclosure, the AMF 32 simply plays a role to read in subscription data via the N8 reference point and delivers the same to a corresponding SMF 34a, 34b, or 34c, and additional processing of the delivered subscription data is performed by each SMF 34a, 34b, and 34c as per the standards. Additionally, the AMF 32, after delivering the SM-related subscription data to the SMF 34a, 34b, or 34c, may delete the data, and this way complies with the stateless requirements of the AMF.

As shown in FIG. 7A, in establishing multiple PDU sessions, the process (S300) of establishing the first PDU session corresponding to CriC services sensitive to latency may be performed separately from and earlier than the processes (S310 and S320) of establishing the other PDU sessions. Specifically, before sending an SM request, the AMF 32 resorts the order of the AMF 32's prior SM requests to send out the CriC service PDU session request earlier than the eMBB/mIoT service PDU session requests.

Operation 420 may include a process (operation 509) in which the AMF 32 transmits an SM request containing subscription data of the UE 30 and a first PDU session establishment request to the SMF 34a.

Since operations 511 to 525 of operation 420 correspond to operations 111 to 125 of FIG. 3A, no detailed description thereof is given below.

Since operations 527 to 533 of operation 430 correspond to operations 127 to 133 of FIG. 3B, no detailed description thereof is given below.

Operation 440 may regard first PDU session confirming and may include a process (operation 535) in which to notify the UE that the first PDU session requested by the UE 30 has successfully be established in the CN, the AMF 32 transfers the SM request containing each piece of N2 SM information received from the (R)AN 31 to the SMF 34a and a processor (operations 537 to 545) in which the SMF 34a looks up the information of the UPF 33a, 33b, and 33c contained in the SM request to set up a connection between the UPF 33a and the N4 reference point, and the UPF 33a sends first downlink data to the UE 30. Meanwhile, since operations 535 to 545 of operation 440 correspond to operations 135 to 145 of FIG. 3B, no detailed description thereof is given below.

Operation 450 may include a process (operation 547) in which the AMF 32 transmits an SM request containing the subscription data of the UE 30 and a second PDU session establishment request of the UE 30 to the SMF 34b and interactions (operation 549) among the UE 30, the AMF 32, the UPF 33b, the SMF 34b, the PCF 35b, and the DN 37b. In this case, since operation 549 corresponds to operations 511 to 525 in the first PDU session establishment process, and no detailed description thereof is presented.

Operation 460 may include a process (operation 551) in which the AMF 32 transmits an SM request containing the subscription data of the UE 30 and a third PDU session establishment request of the UE 30 to the SMF 34c and interactions (operation 553) among the UE 30, the AMF 32, the UPF 33c, the SMF 34c, the PCF 35c, and the DN 37c. In this case, since operation 553 corresponds to operations 511 to 525 in the first PDU session establishment process, and no detailed description thereof is presented.

Operation 470 may include a second PDU session and third PDU session responding process and may include a process (operation 555) in which the AMF 32 integrates information about the two PDU sessions into a single N2 PDU session request message and delivers the message to the (R)AN 31, a process (operation 557) in which the (R)AN 31 delivers AN-related signaling for the two PDU sessions to the UE 30, a process (operation 559) in which the (R)AN 31 delivers the IP address of the N3 reference point which corresponds to the interface between the (R)AN 31 and the UPF 33b or 33c for the two established PDU sessions to the AMF 32, and a processor (operation 561) in which the UE 30 transmits first uplink data to the assigned UPF 33b or 33c.

Operation 480 is a second PDU session confirming process, and operations 563 and 565 correspond to operations 535 to 545 in the first PDU session establishment process, and their detailed description is omitted.

Operation 490 is a third PDU session confirming process, and operations 567 and 569 correspond to operations 535 to 545 in the first PDU session establishment process, and their detailed description is omitted.

As set forth above, the SMFs 34a, 34b, and 34c, upon receiving a request for establishing multiple PDU sessions of the UE 30 and an SM request containing the subscription data of the UE 30 from the AMF 32, may exchange signaling with other NFs (the PCFs 35a, 35b, and 35c, the UPFs 33a, 33b, and 33c, and the AMF 32) and other network components (the DNs 37a, 37b, and 37c, the (R)AN 31, and the UE 30), proceeding to establish sessions. In this case, an embodiment may integrate the N2 PDU session request and the N2 PDU session request ack into a single messsage and transmit the message to minimize interactions between the UE 30 and the CN and to simplify signaling performed during the course. However, such integrated responding may delay the data transmission/reception of PDU sessions, and this issue may worsen as more PDU sessions desired to be established.

According to the disclosure, in establishing multiple PDU sessions, a process for establishing a PDU session for CriC services which is sensitive to latency is performed separately and earlier than processes for establishing the other PDU sessions. For example, the other sessions may include PDU sessions corresponding to eMBB and mIoT services.

Specifically, the AMF 32 may collectively and previously fetch subscription data related to the UE 30 from the UDM 36 and may send SM requests containing the subscription data of the UE 30 to the SMFs 34a, 34b, and 34c. In this case, before sending an SM request, the AMF 32 resorts the order of the AMF 32's prior SM requests to send out the CriC service PDU session request earlier than the eMBB/mIoT service PDU session requests.

Thus, the process for establishing a PDU session corresponding to CriC services may individually be performed to be consistent with the standards, and the process for establishing the other two PDU sessions corresponding to the eMM is performed after the prior PDU session establishment process. Meanwhile, after finishing the first eMBB service-corresponding PDU session establishment process and the second eMM service-corresponding PDU session establishment process, the AMF 32 produces a single N2 PDU session request message by integrating the information about the two PDU sessions and delivers the message to the (R)AN 31.

In other words, according to the disclosure, the above-described processes may minimize interactions between the UE 30 and the CN by reducing the number of times of duplicate signaling in establishing multiple PDU sessions.

Figure 8:
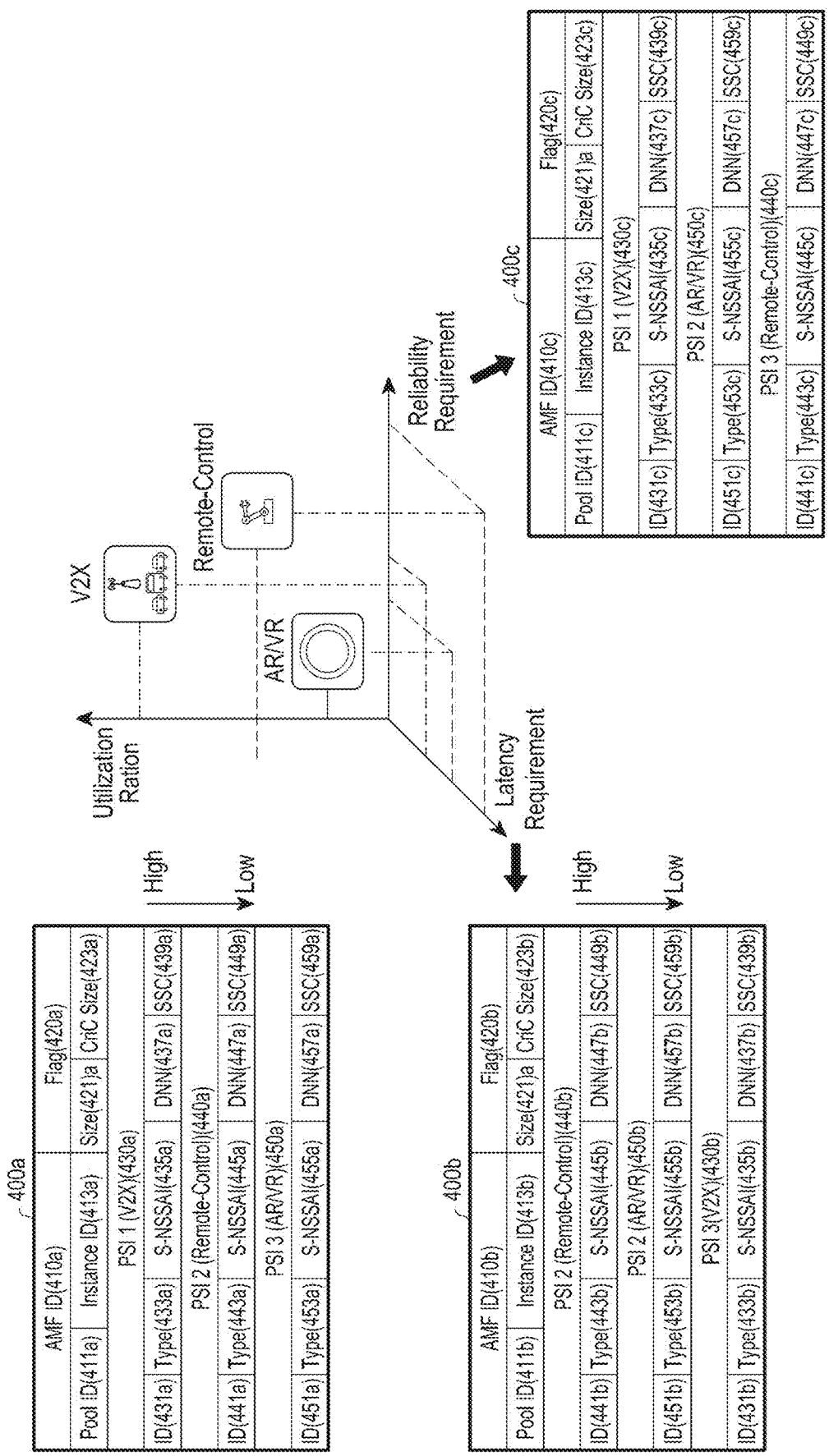
FIG. 8 illustrates various examples of an iMess for establishing a plurality of PDU sessions corresponding to a CriC service.

FIG. 8 illustrates various examples 400a, 400b, and 400c of an iMess for establishing a plurality of PDU sessions corresponding to a CriC service.

While FIG. 6 and FIGS. 7A, 7B, and 7C illustrate the circumstance where there is only one CriC service PDU session, FIG. 8 illustrates an iMess embodiment when there are two or more PDU sessions corresponding to CriC services.

Where there is a plurality of CriC service-required applications, such as V2X, remote-control, and AR/VR, the priority of establishing the CriC service PDU sessions may be determined based on priority, and the plurality of PSIs of the iMess 400a, 400b, and 400c may also be resorted. The plurality of PSIs may include PSIs 430a, 430b, and 430c of a V2X application, PSIs 440a, 440b, and 440c of a remote-control application, and PSIs 450a, 450b, and 450c of an AR/VR application.

The AMF 32 proceeds to establish PDU sessions in the PSI order specified in the iMess 400a, 400b, and 400c upon establishing PDU sessions corresponding to CriC services.

The priority regards the preference of the UE 30 and this may directly be set by the user.

Further, where there are a plurality of PDU sessions corresponding to CriC services as shown in FIG. 8, the order of establishing the plurality of PDU sessions corresponding to CriC services may be determined based on requirements for utilization, latency, and reliability of each of the plurality of applications requiring CriC services and the environment of the UE.

For example, among the requirements for each application to provide CriC services, reliability may be influenced by various factors, such as signal strength, channel congestion, UE's location, and load of the NF. However, a method for quantifying the degree and setting priority may easily be addressed according to the disclosure. Thus, for simplicity purposes, the description focuses on quantifying reliability and setting priority in light of signal strength.

For example, where the UE using the AR/VR application and the remote-control application receives weak radio signals, the high-level reliability required for the remote-control application cannot be met, and thus, the AR/VR application which requires a relatively low reliability has a higher priority than the remote-control application. In this case, among the plurality of PSIs contained in the iMess, the PSIs 450a, 450b, and 450c of the AR/VR application may be positioned higher than the PSIs 440a, 440b, and 440c of the remote-control application.

Meanwhile, the AMF performs a PDU session establishment process in the order of the PSIs arranged in the iMess upon establishing multiple PDU sessions corresponding to CriC services. Thus, the AMF establishes a PDU session corresponding to CriC services of the AR/VR application and then a PDU session corresponding to CriC services of the remote-control application.

As shown in FIG. 6, PSIs of eMBB or mIoT services are arranged behind the PSIs of the remote-control application, and a process for establishing multiple PDU sessions may be performed in an integrated manner as described above in connection with FIGS. 7A and 7B.

Figure 9:
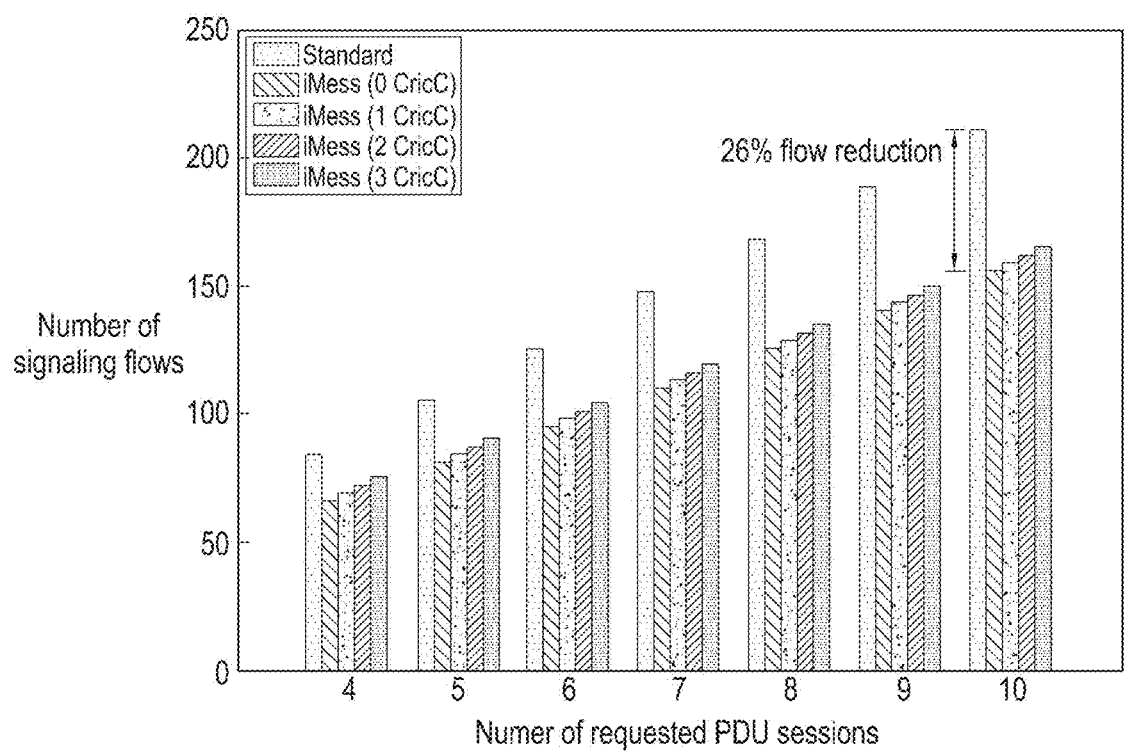
FIG. 9 illustrates an enhancement achieved by a method for establishing a plurality of PDU sessions based on an iMess as compared with a legacy method for establishing a plurality of PDU sessions.

FIG. 9 illustrates an enhancement achieved by a method for establishing a plurality of PDU sessions based on an iMess as compared with a legacy method for establishing a plurality of PDU sessions.

FIG. 9 illustrates the number of signaling flows as per variations in the type of PDU sessions requested and the number of PDU sessions requested.

For evaluating performance, the number of signaling flows in a standard PDU session establishment process following the call flow of FIGS. 5A and 5B was compared with the number of signaling flows produced in a multiple PDU session establishing process based on the iMess as per the call flow of FIGS. 7A and 7B. Further, performance was measured while varying the number of PDU sessions corresponding to CriC services from zero to three assuming the circumstance where three CriC service applications, such as V2X, remote-control, and AR/VR, are running.

As shown in FIG. 9, where the requested PDU sessions lack a PDU session corresponding to CriC services, PDU session establishment utilizing the iMess shows a performance enhancement by 26% as compared with standard PDU session establishment.

As shown in FIG. 9, although the number of signaling flows increases as the number of CriC service PDU sessions increases, the increasing degree is not high, and resultantly, the degree of performance enhancement remains as compared with the standards.

Although an example of the serving CN control plane function as shown in FIGS. 10 to 18 may include an AMF, embodiments of the disclosure are not limited thereto.

Figure 10:
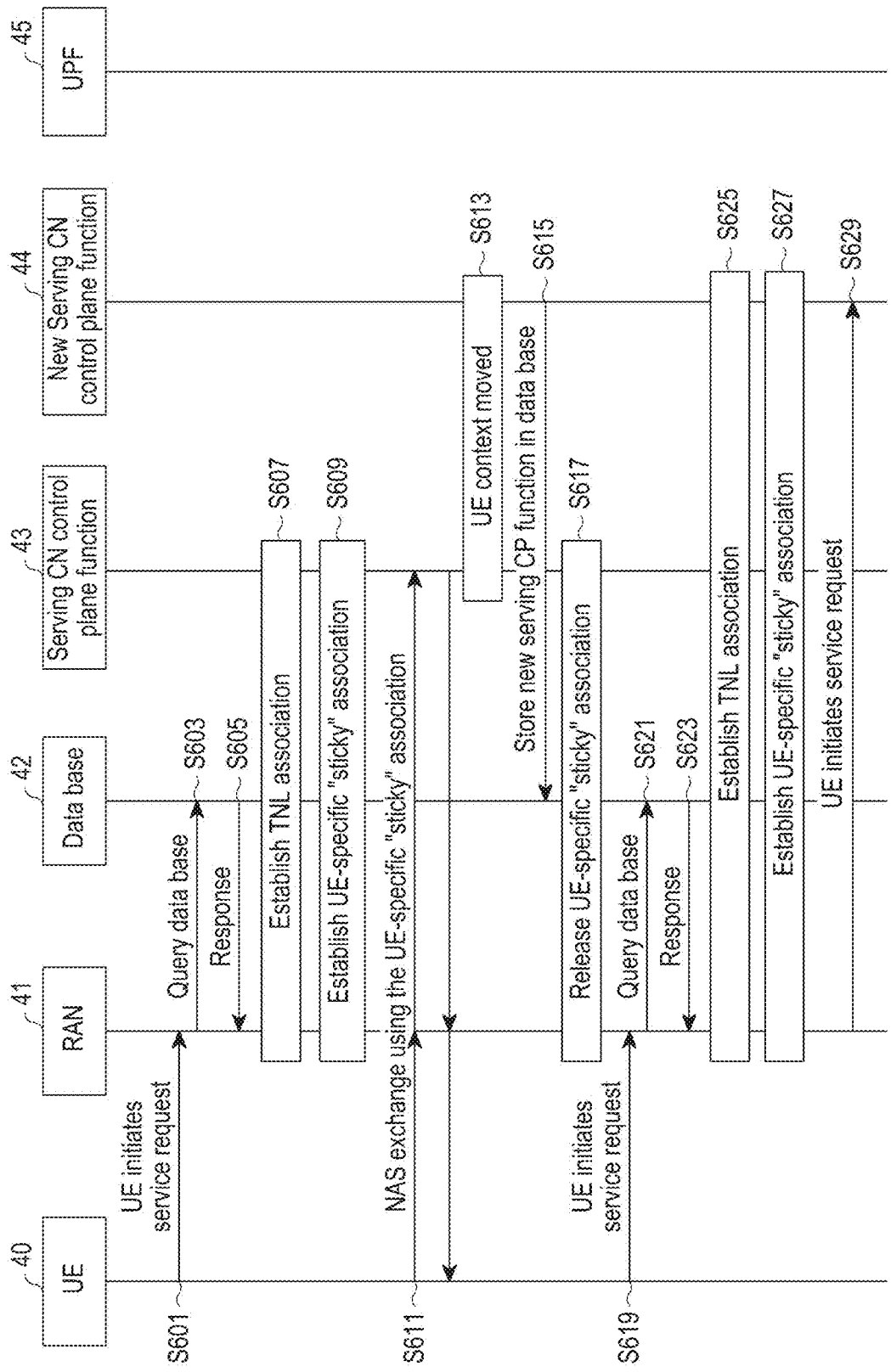
FIG. 10 illustrates a flowchart of a migration procedure of an NF based on a database as per a scheme.

FIG. 10 illustrates a flowchart of a migration procedure of an NF based on a database.

Referring to FIG. 10, upon migrating from a serving CN control plane function 43 to a new serving CN control plane function 44, signaling interaction may occur among the UE 40, the RAN 41, and the database 42, so that the UE 40 may send a service request message to the new serving CN control plane function 44.

In operation 601, the UE 40 attempts to send a service request to the RAN 41 to exchange initial signaling with the core network (CN).

In operation 603, the RAN 41 inquires the database 42 to obtain information about which serving CN control plane function 43 the UE 40 needs to connect to.

In operation 605, the RAN 41 interprets serving CN control plane function (43) information received from the database 42, obtaining the physical address (e.g., IP address).

In operation 607, the RAN 41 performs a TNL association process between the RAN 41 and the serving CN control plane function 43 through the physical address. Where there is a connection already made between the RAN 41 and the serving CN control plane function 43 by another UE 40, the operation may be omitted.

In operation 609, the RAN 41 makes a UE-specific connection between the RAN 41 and the serving CN control plane function 43.

In operation 611, the RAN 41 delivers a signaling message via the UE-specific connection made in operation 609 without inquiring the database 42. For example, the signaling message is a NAS message.

In operation 613, when the serving CN control plane function 43 migrates to the new serving CN control plane function 44, UE context information is transferred to the new serving CN control plane function 44.

In operation 615, the database 42 stores new serving CN control plane function (44) information.

In operation 617, the prior serving CN control plane function 43 sends a NG2 message to the RAN 41, terminating the UE-specific RAN-CN connection.

In operation 619, the UE 40 attempts to send a service request to the RAN 41 to exchange initial signaling with a new core network (CN). For example, the UE 40 may transfer a new NAS message to the RAN 41.

In operation 621, since there is no UE-specific connection between the RAN 41 and the new serving CN control plane function 44, the RAN 41 inquires the database 42 to obtain information about which new serving CN control plane function 44 the UE 40 needs to connect to.

In operation 623, the RAN 41 interprets new serving CN control plane function (44) information received from the database 42, obtaining the physical address (e.g., IP address).

In operation 625, the RAN 41 performs a TNL association process between the RAN 41 and the new serving CN control plane function 44 through the physical address.

In operation 627, the RAN 41 makes a UE-specific connection between the RAN 41 and the new serving CN control plane function 44.

In operation 629, the RAN 41 proceeds to exchange UE-initiated NAS messages that have not been processed through the UE-specific connection made in operation 627.

Generally, legacy 4G networks (e.g., LTE networks) support connection between UE and MME based on the globally unique temporary identifier (GUTI). That is, users connect to a particular mobility management entity (MME) that manages them via the GUTI, and the radio access network (RAN) transfers the users' control messages (e.g., NAS messages) to the particular MME based on the GUTI. As such, connecting particular entities via identifiers is called stickiness. However, in virtual environments, the functions in the MME are defined as virtualized functions, and generation, deletion, and migration of functions frequently occur. In other words, supporting connectivity between the UE and the network control plane via an identifier denoting a particular network function (NF) as previous requires that the user be frequently notified of the identifier, causing large overhead on the UE side.

Although FIGS. 1 to 9 illustrate examples in which one UE and one AMF perform signaling, if a migration occurs from a first AMF of a plurality of AMFs included in the AMF pool of FIG. 6 to a second AMF, the UE 40 needs to re-send a NAS message to the second AMF.

That is, as shown in FIG. 10, the conventional Intel solution is a reactive type in which UE-AMF connectivity is supported in such a way that the UE is disconnected from the AMF when the AMF changes to another and is later reconnected as necessary. For such reason, latency occurs in exchanging NAS messages between the UE 40 and the new AMF.

According to embodiments of the disclosure, the 5G system may further include a proxy-based NF connected to each of an (R)AN and an NF, addressing the conventional stickiness issue based on the proxy network function (NF) while shortening the latency consumed in delivering a new NAS message after changing the NF.

FIGS. 11 and 12 illustrate various examples of implementing a proxy-based NF.

Referring to FIG. 11, a proxy 52a may be implemented as one NF in the data center. Referring to FIG. 12, a proxy 52b may be implemented along with an eNB 51b. In other words, proxies described herein may be implemented with entities as shown in FIGS. 11 and 12.

FIG. 13 illustrates compatibility between a temporary ID (temp ID) architecture and an embodiment of the present disclosure. Referring to FIG. 13, the AMF group ID 1350a of the legacy temp ID architecture 1300 defined by the 3GPP may match the proxy ID 1350b according to the disclosure. This represents that embodiments of the disclosure can be implemented without modifying the 3GPP temp ID architecture 1300.

Figure 14:
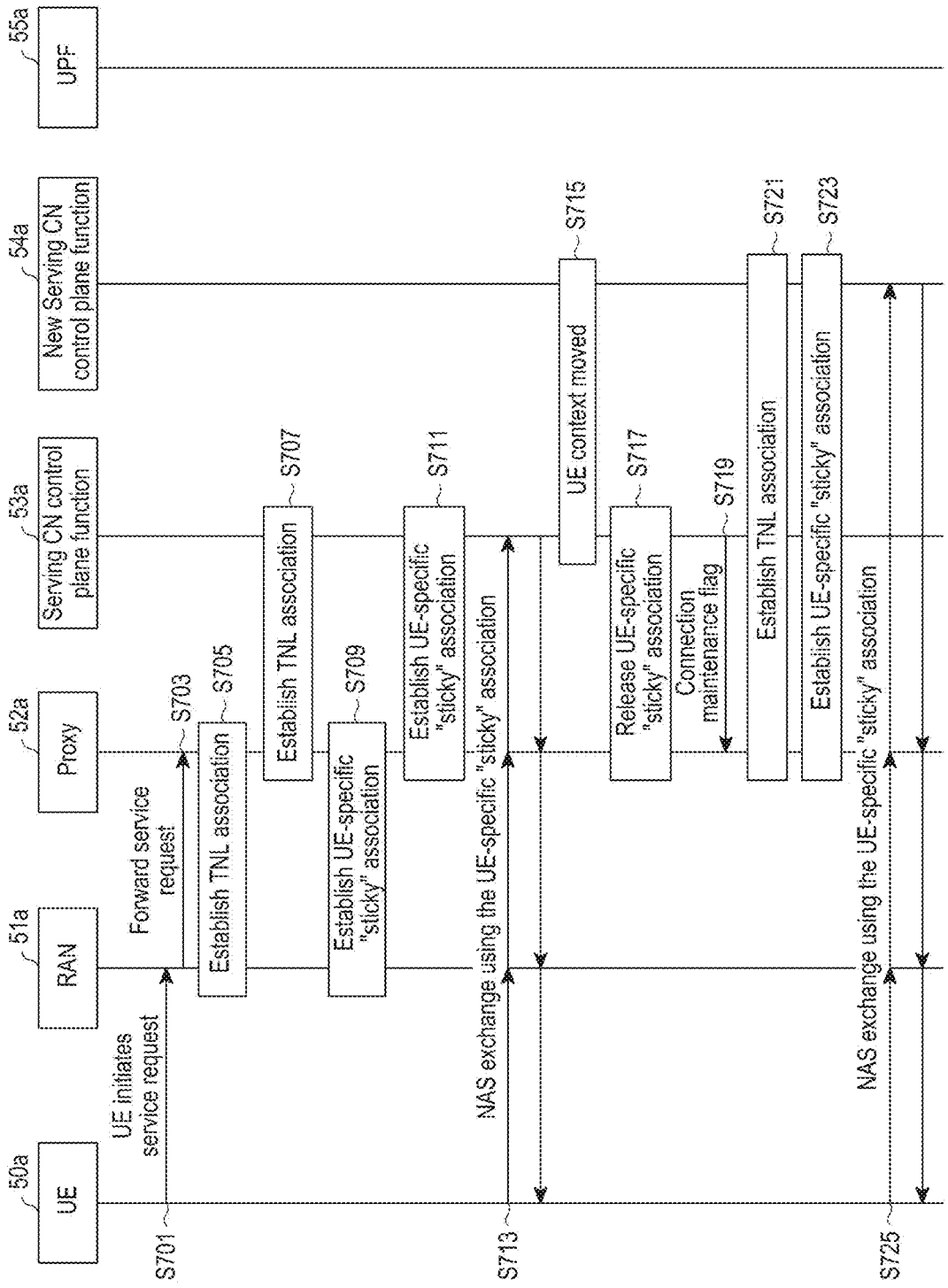
FIG. 14 illustrates a flowchart of a procedure for a proxy NF-based NF migration supporting scheme.

FIG. 14 illustrates flowchart of a procedure for a proxy NF-based NF migration supporting scheme;

In operation 701, the UE 50a attempts to send a service request to the RAN 51a to exchange initial signaling with the core network (CN). For example, the UE 50a may transmit a service request message to the RAN 51a.

In operation 703, the RAN 51a transfers the service request received in operation 701 to the proxy 52a.

In operation 705, the proxy 52a performs TNL connection with the RAN 51a.

In operation 707, the proxy 52a performs TNL connection with the serving CN control plane function 53a as well.

In operation 709, the RAN 51a and the proxy 52a perform UE-specific sticky connection.

In operation 711, the serving CN control plane function 53a and the proxy 52a also perform UE-specific sticky connection.

In operation 713, NAS messages are exchanged between the UE 50a and the serving CN control plane function 53a via the UE-specific sticky connection.

In operation 715, when the serving CN control plane function 53a migrates to a new serving CN control plane function 54*a*, UE context information is transferred to the new serving CN control plane function 54*a*.

In operation 717, the serving CN control plane function 53*a* releases the UE-specific sticky connection with the proxy 52*a* and provides information about the new serving CN control plane function 54*a* to the proxy 52*a*.

In operation 719, the serving CN control plane function 53*a* transfers a connection maintenance flag message to the proxy 52*a* to indicate that the connection needs to last.

In operation 721, the proxy 52*a* performs TNL connection with the new serving CN control plane function 54*a*.

In operation 723, a UE-specific sticky connection is established between the proxy 52*a* and the new serving CN control plane function 54*a*.

In operation 725, the NAS message of the UE 50*a* is exchanged with the new serving CN control plane function 54*a* via the UE-specific sticky connection.

As set forth above, according to the disclosure, when the NF 53*a* migrates, connection between the proxy 52*a* and the new NF 54*a* may proactively be performed (operations 715 to 723). By so doing, after the NF migrates, latency may be further reduced in transferring new NAS messages. However, costs may be incurred to maintain the RAN-proxy-AMF connection (i.e., N2AP connection) even after the NF's migration. That is, there is a trade-off between NAS message transfer latency and costs for maintaining connection.

To optimize the trade-off, the constancy of the RAN-proxy-AMF connection (N2AP connection) may be determined per network slice (NS).

Figure 15:
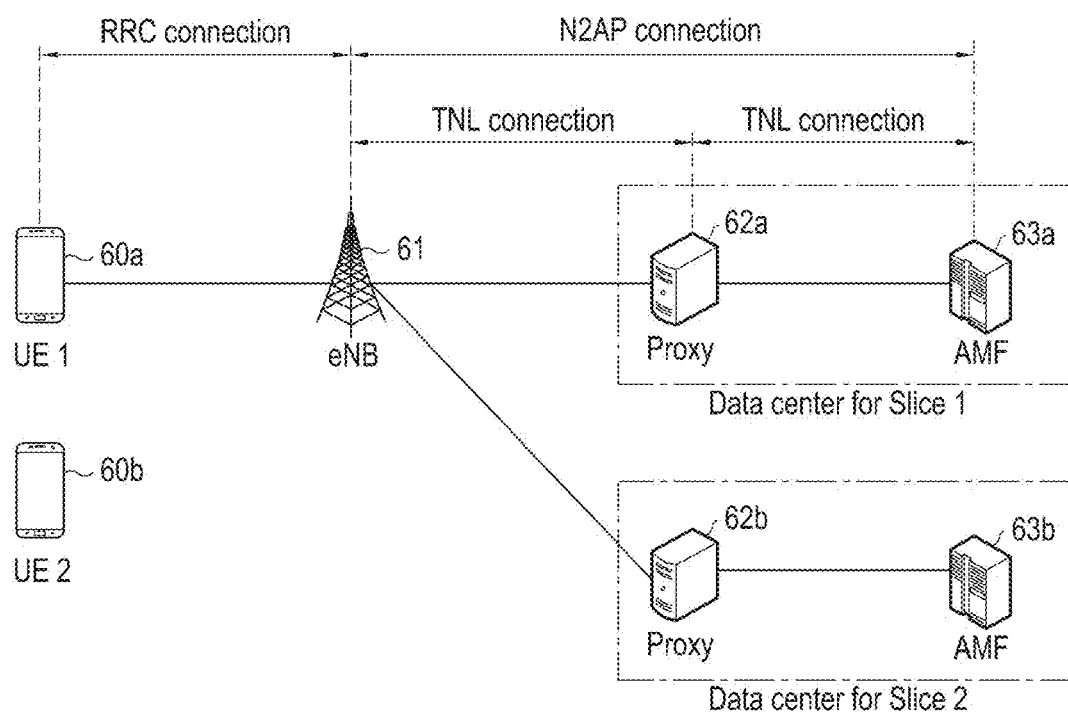
FIG. 15 illustrates various examples of managing the constancy of the RAN-proxy-AMF connection (i.e., N2AP connection) based on the characteristics of the network slice (NS)

FIG. 15 illustrates various examples of managing the constancy of the RAN-proxy-AMF connection (i.e, N2AP connection) based on the characteristics of the network slice (NS).

Referring to FIG. 15, where UE1 60*a* and UE2 60*b* are connected to a data center for slice 1 (NS1) and a data center for slice 2 (NS2), respectively, and the data center for slice 1 (NS1) is a slice that offers latency-sensitive services, but the data center for slice 2 (NS2) is not, the N2AP connection of the data center for slice 1 (NS1) may always be maintained, but the N2AP connection of the data center for slice 2 (NS2) might not.

As considered in managing the constancy of N2AP connection per NS, there may be not only the trade-off between latency and costs for maintaining connection but also other pros and cons that may arise due to maintaining the N2AP connection. For example, where there is a service whose qualify of service (QoS) or throughput can be enhanced by maintaining the N2AP connection, whether there is the constancy of the N2AP connection may be determined based on such service.

Figure 16A:
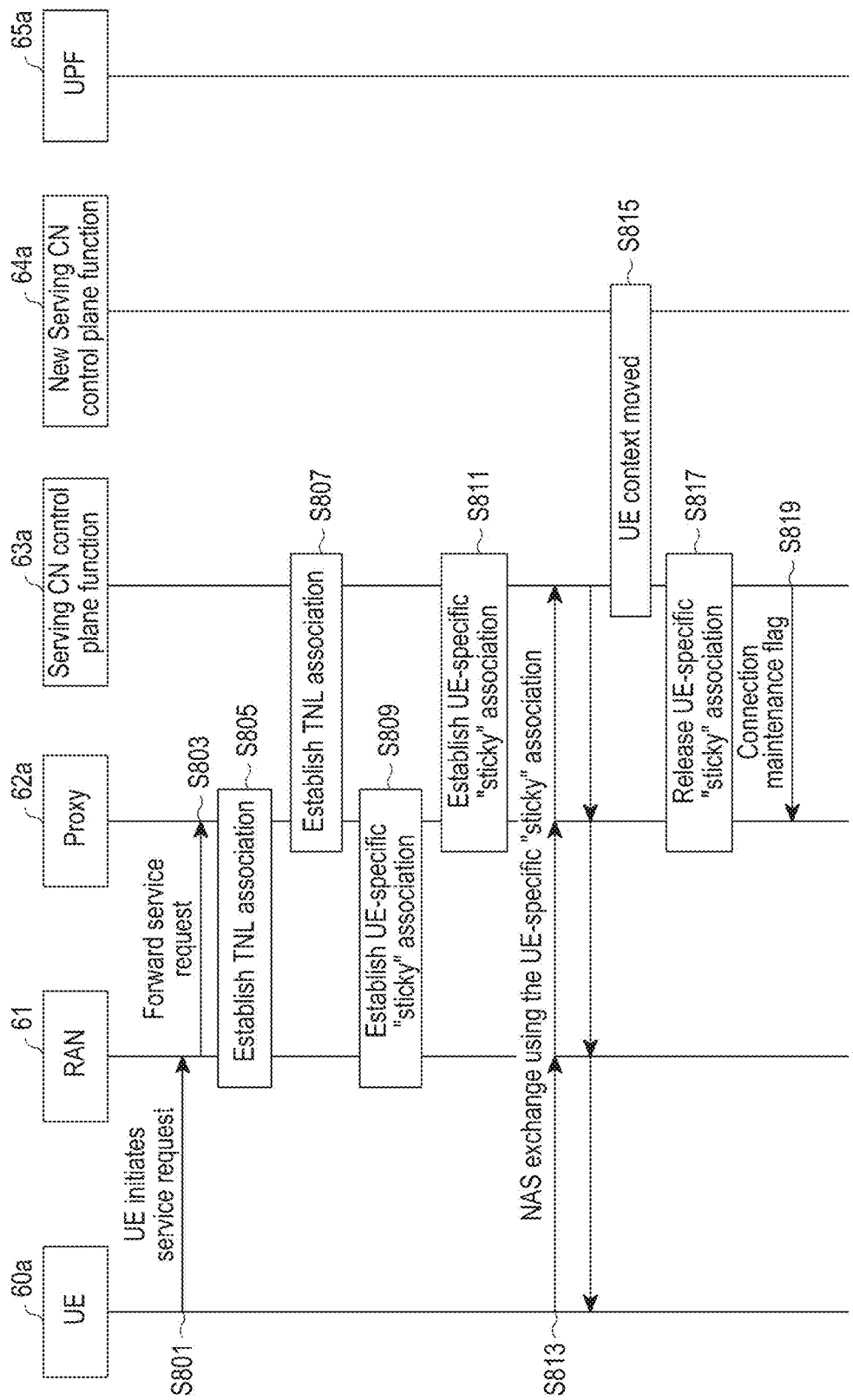
FIGS. 16A and 16B illustrate operations on a slice that does not maintain N2AP connection.
Figure 16B:
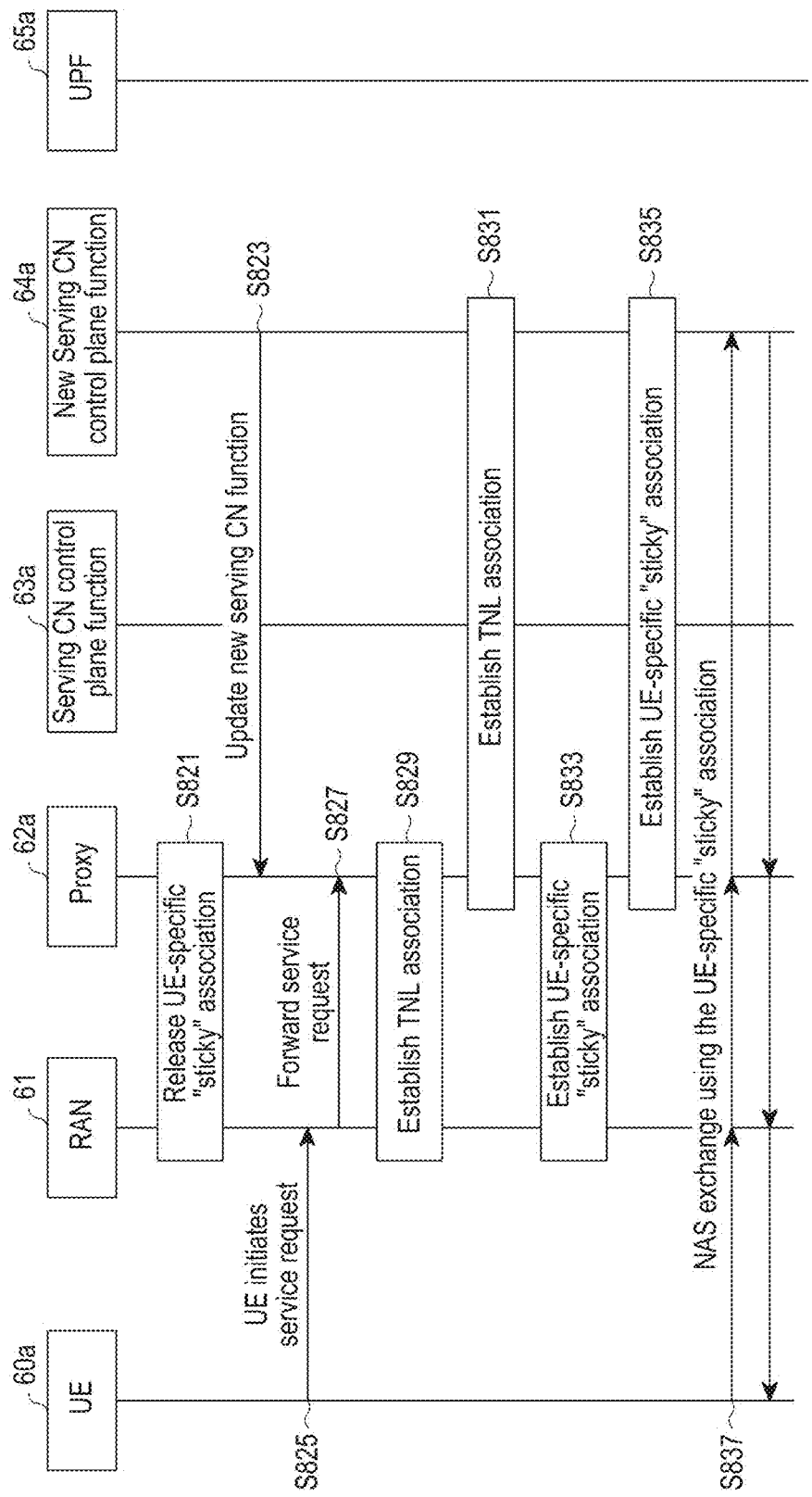

FIGS. 16A and 16B illustrates operations on a slice that does not maintain N2AP connection.

Since operations 801 to 817 correspond to operations 701 to 717 of FIG. 14, no detailed description thereof is presented below.

In operation 819, the serving CN control plane function 63*a* (i.e., the AMF) of the NS determines whether the N2AP connection lasts and notifies the proxy 62*a* of the same.

Where the proxy 62*a* obtains the characteristics of the NS in a different way or manages the characteristics of the NS on the proxy 62*a*'s own, operation 819 may be omitted.

Upon determining in operation 819 that the N2AP connection does not last, after the NF 63*a* migrates and for the UE 60A to transfer a NAS message to the migrated NF 64*a*, a process (operations 825 to 837) is required to establish a new N2AP connection.

The slice whose N2AP connection lasts follows the process shown in FIG. 14.

Meanwhile, where only one proxy 62*a* is deployed according to an embodiment, a bottleneck may occur in which all NAS messages may be processed by the proxy 62*a*. To address this, there is a need for a scheme to distribute proxies 62*a* (i.e., maintaining a proxy pool) and select a proper one 62*a* among them. Simple schemes for selecting the proxy 62*a* may include database-based load balancing supporting and random selection-based load balancing supporting.

Figure 17:
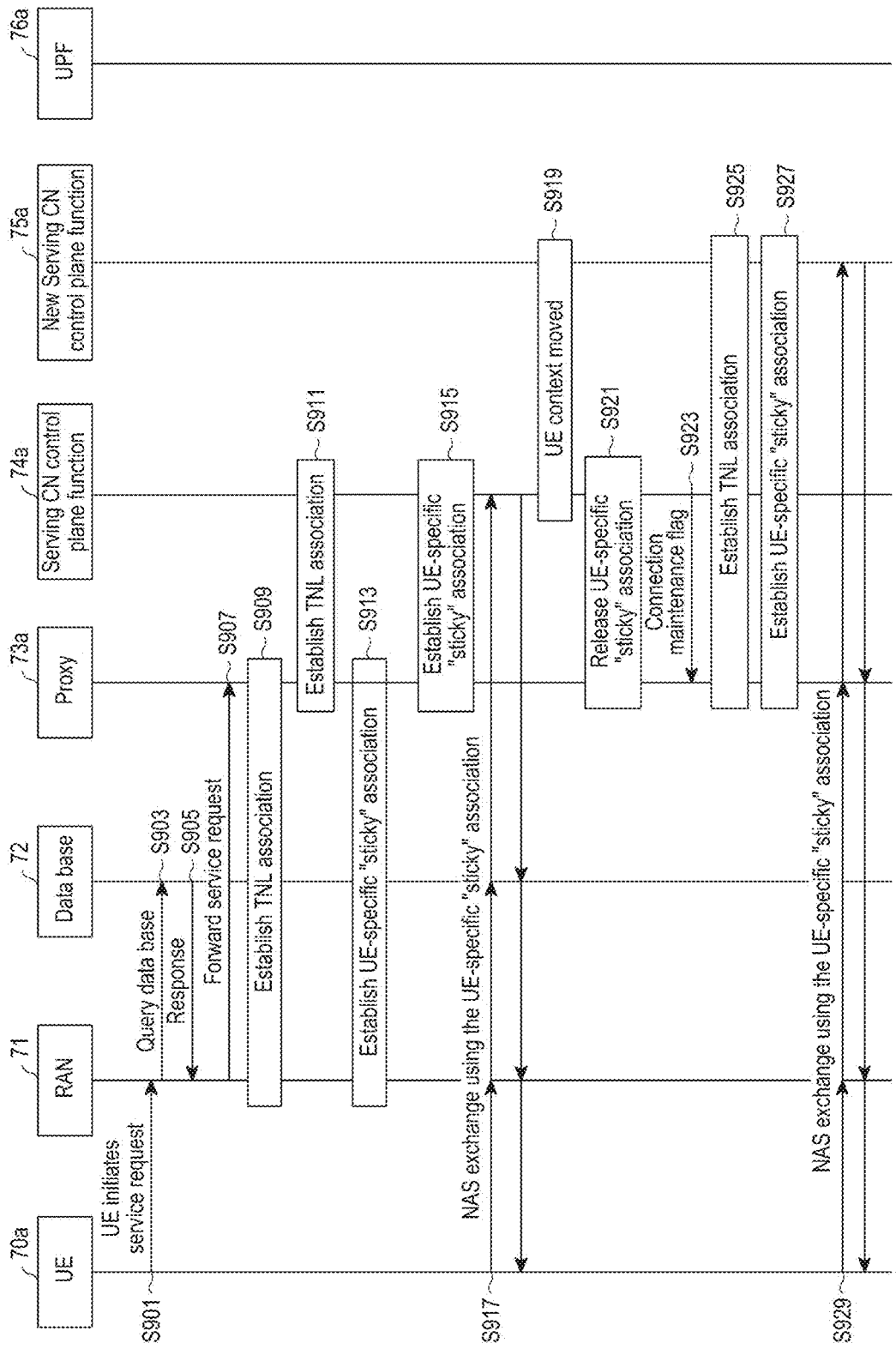
FIG. 17 illustrates a flowchart of a procedure for database-based load balancing supporting.

FIG. 17 illustrates a flowchart of a procedure for database-based load balancing supporting.

Since operation 901 corresponds to operation 701 of FIG. 14, no detailed description thereof is given.

In operations 903 and 905, the RAN 71 obtains information about a proxy available from the proxy pool by an inquiry/response process. For example, the RAN 71 may inquire the database to obtain information about a low-load proxy 73*a* and make a connection to the proxy 73*a*.

Since operations 907 to 929 correspond to operations 703 to 705 of FIG. 14, no detailed description thereof is presented below.

As set forth above, upon initial access, the RAN 71 inquires the database about a proxy 73*a* (e.g., a low-load proxy) available from the proxy pool, and the database transmits information about the available proxy 73*a* to the RAN 71.

Figure 18:
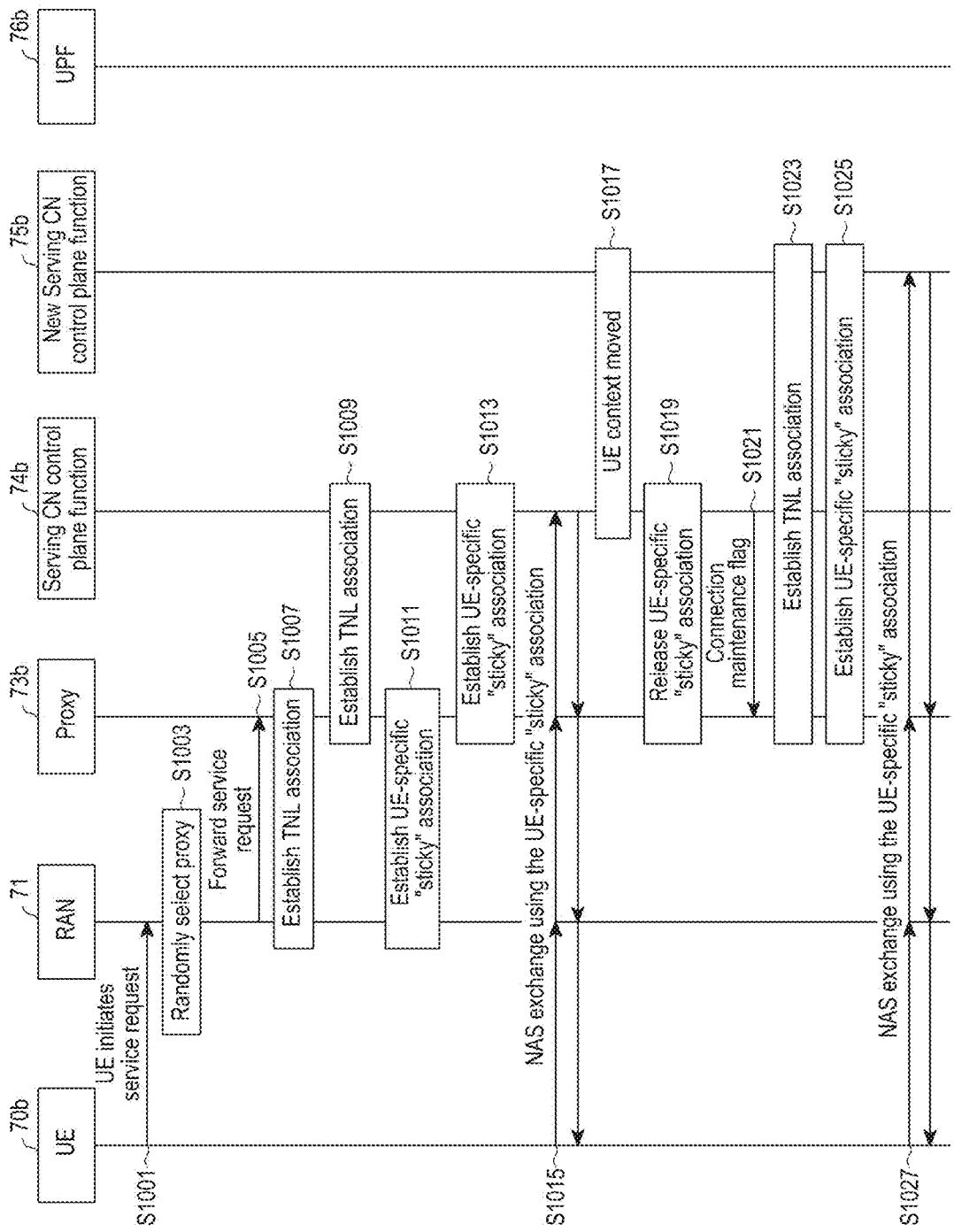
FIG. 18 illustrates a flowchart of a procedure for random selection-based load balancing supporting.

FIG. 18 illustrates a flowchart of a procedure for random selection-based load balancing supporting.

Since operation 1001 corresponds to operation 701 of FIG. 14, no detailed description thereof is given.

In operation 1003, before connecting to a proxy 73*b*, the RAN 71 selects any proxy from the proxy pool. For example, upon initial access, the RAN 71 may select any proxy 73*b* from the proxy pool and may make a connection to the proxy 73*b*.

Since operations 1005 to 1027 correspond to operations 703 to 705 of FIG. 14, no detailed description thereof is presented below.

Random selection-based load balancing supporting may not deliver precise load distribution effects as compared with the database-based load balancing supporting but may be advantageous in that the proxies do not have load maintenance overhead.

Figure 19:
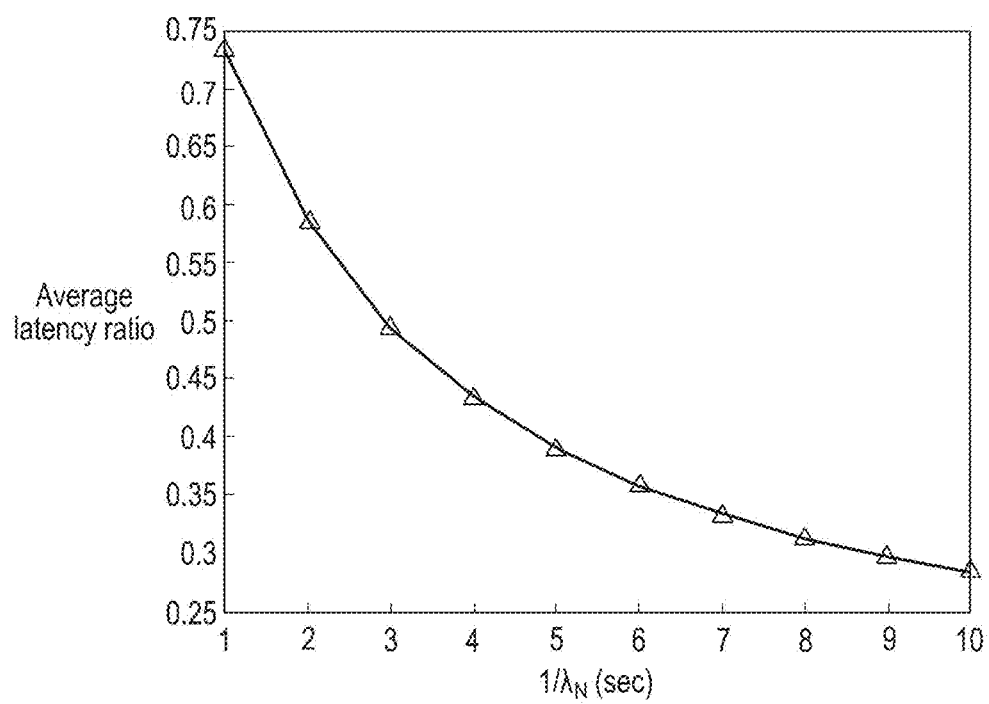
FIG. 19 illustrates a graph of a latency ratio of the conventional solution and an embodiment of the disclosure that has been measured while prolonging the mean occurrence period of the NAS message.

FIG. 19 illustrates a graph of a latency ratio of the conventional solution and an embodiment of the disclosure that has been measured while prolonging the mean occurrence period of the NAS message. To see the effects of embodiments of the disclosure, an event-driven simulator was developed to a latency reduction rate relative to the existing solution (the Intel solution). As evident from FIG. 19, the embodiment of the disclosure could save latency by 3% to 70%.

Figure 20:
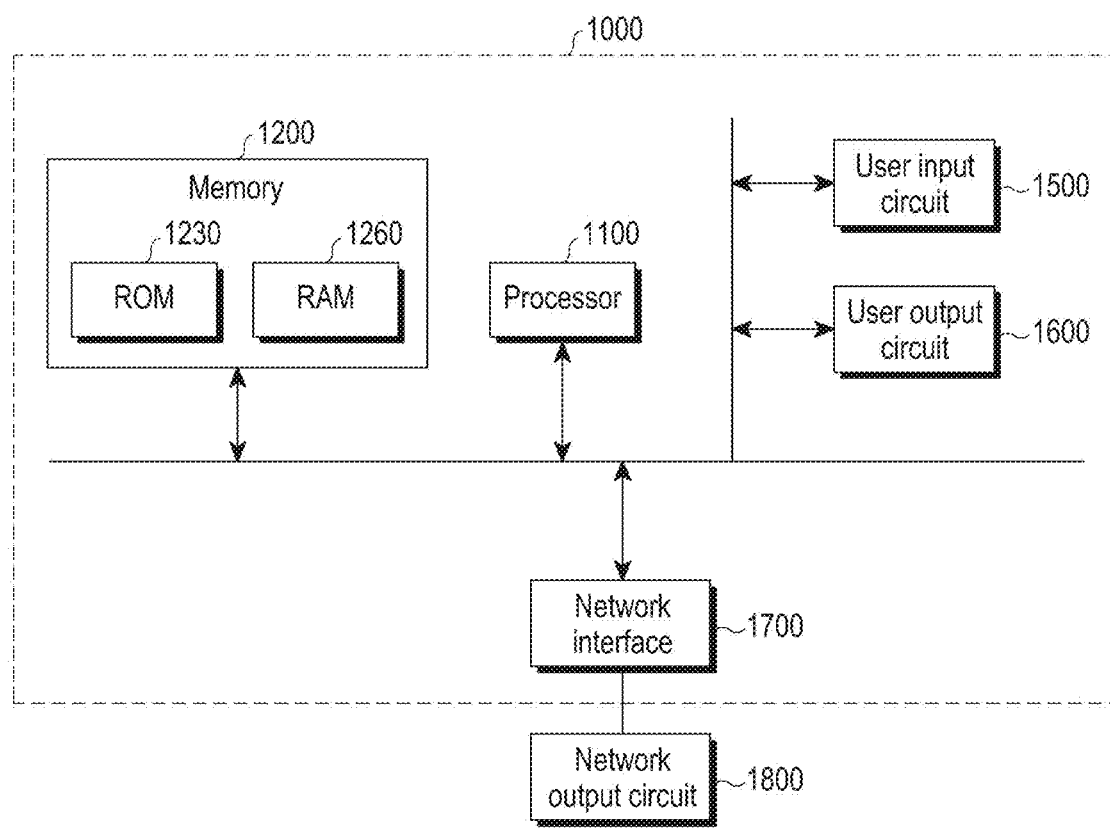
FIG. 20 illustrates an example of a configuration of a UE in which a method for establishing a plurality of PDU sessions is implemented according to an embodiment.

FIG. 20 illustrates an example of a configuration of a UE in which a method for establishing a plurality of PDU sessions is implemented according to an embodiment.

Meanwhile, a method for establishing a plurality of PDU sessions according to an embodiment may be implemented on a UE 1000 or recorded in a recording medium. Referring to FIG. 1, the UE 1000 may include at least one or more processors 1100 and a memory 1200.

The processor 1100 may be a central processing unit (CPU) or a semiconductor device to process instructions stored in the memory 1200.

The processor 1100 may be a controller to control all the operations of the UE 1000. The controller may execute the operations of the UE 1000 by reading the programming code out of the memory 120 and running the programming code.

The UE 1000 may further include at least one of a user input circuit 1500, a data communication bus 1300, or a user output circuit 1600. The above-described components may perform data communication through the data communication bus 1300.

The UE 1000 may further include a network interface 1700 connected to the network output circuit 1800.

The memory 1200 may include various types of volatile or non-volatile storage media. For example, the memory 1200 may include a read only memory (ROM) 1230 and a random access memory (RAM) 1260.

Accordingly, a method for establishing a plurality of PDU session according to an embodiment may be implemented in such a manner as to be able to run on a computer. According to an embodiment, when a method for establishing a plurality of PDU sessions is performed on a computer device, computer readable commands may perform the operation method according to the disclosure.

Meanwhile, a method for establishing a plurality of PDU sessions may be implemented in codes that a computer may read out of a recording medium, according to an embodiment. The computer-readable recording medium includes all types of recording media storing data that can be read out or interpreted by the UE 1000. For example, the computer-readable recording medium may include a ROM, a RAM, a magnetic tape, a magnetic disc, a flash memory, and an optical data storage device. Further, the computer-readable recording medium may be distributed on the UE 1000 connected via the computer communication network and may be stored and run as codes readable in a distributive manner.

Operations of a system including a core network (CN) including a plurality of network functions (NFs), a UE, an (R)AN, and a data network to establish a plurality of PDU sessions between the UE and the data network (DN) are sequentially described below.

Figure 21:
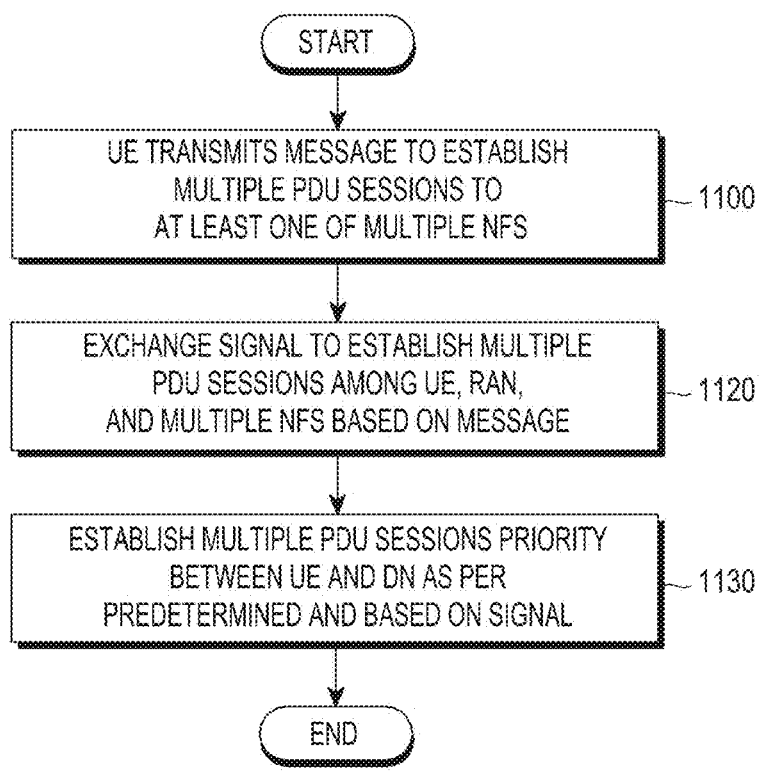
FIGS. 21 and 22 illustrate flowcharts of a method for establishing a plurality of PDU sessions according to an embodiment.
Figure 22:
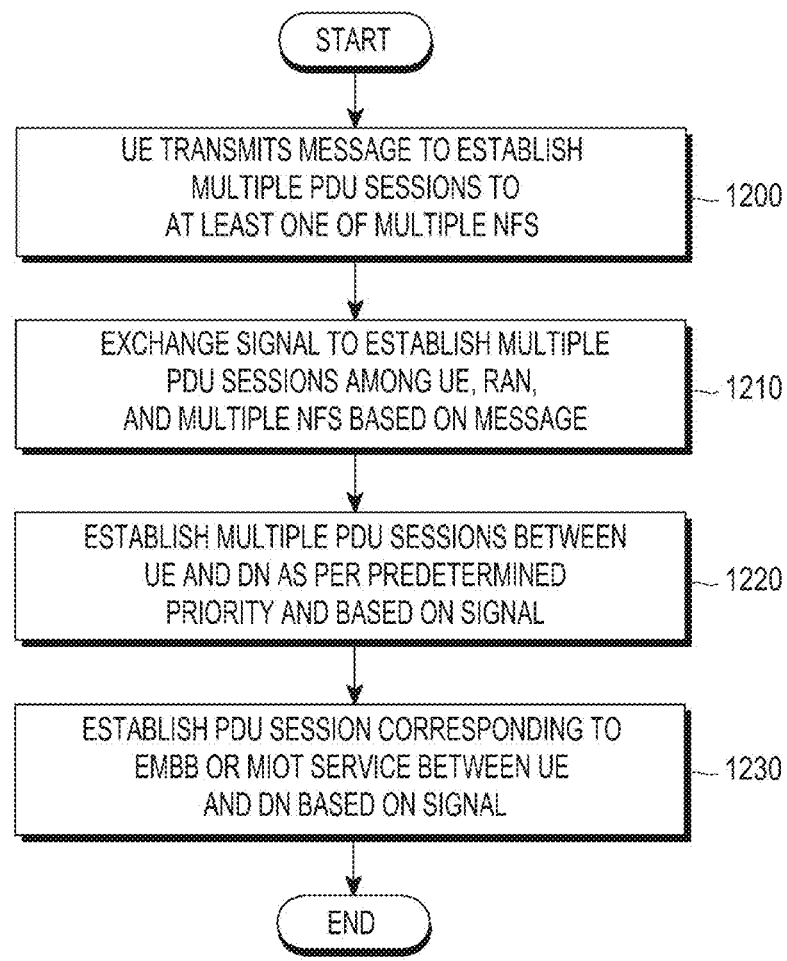

FIGS. 21 and 22 illustrate flowcharts of a method for establishing a plurality of PDU sessions according to an embodiment.

In operation 1100, the UE transmits a message to establish a plurality of PDU sessions to at least one NF among a plurality of NFs.

The message may contain information about a service corresponding to the plurality of PDU sessions.

The message may be a NAS message containing an iMess as shown in FIG. 6.

For example, the iMess may include an AMF ID field containing information about a core access and mobility management function (AMF) to which the UE desires to send a PDU session establishment request, a flag field containing information about the number of the plurality of PDU sessions which the UE desires to establish and the number of PDU sessions providing a CriC service among the plurality of PDU sessions, and a plurality of PSI fields containing information about a plurality of PDU session requests.

The plurality of PSI fields may be sorted top to down corresponding to the priority of establishing the plurality of PDU sessions.

The message may include multiple PDU session establishment request information and may be a NAS message that is sent out while the first one of the plurality of PDU sessions is established.

In operation 1120, signals are exchanged to establish a plurality of PDU sessions among the UE, the (R)AN, and the plurality of network functions based on the message received in operation 1100.

For example, the AMF may previously and collectively fetch subscription data related to the UE from the UDM and may transmit an SM request containing the UE's subscription data and the UE's PDU session establishment request to the SMF. As such, according to the disclosure, the number of times of duplicate signaling may be reduced by previously and collectively fetching the UE-related subscription data from the UDM, minimizing interactions between the UE and the CN.

In this case, the SMF, upon receiving the UE's request for establishing multiple PDU sessions and the SM request containing the UE's subscription data from the AMF, may exchange signaling with other NFs (the PCF, UPF, and AMF) and other network components (the DN, (R)AN, and UE), proceeding to establish the sessions.

In operation 1130, a plurality of PDU sessions are established according to predetermined priority between the UE and the data network (DN) based on the signals exchanged in operation 1120.

The plurality of PDU sessions may sequentially be established based on the order of sorting the PSI fields contained in the iMess. In this case, the order of sorting the PSI fields may be determined by the priority determined based on the information about the services corresponding to the PDU sessions. For example, the PSI corresponding to the CriC service requiring immediate PDU session establishment is positioned higher than the PSIs corresponding to the eMBB or mIoT, so that the PDU session corresponding to the CriC service is given a higher priority than the PDU sessions corresponding to the eMBB or mIoT service.

Meanwhile, where there are multiple CriC service-required applications, such as V2X, remote-control, and AR/VR, the priority related to establishing the plurality of PDU sessions may directly be set by the user. Further, the priority may be determined based on requirements for the utilization, latency, and reliability of each of the plurality of CriC service-required applications and the UE's environment.

Further, when PDU sessions corresponding to the eMBB or mIoT are established after the CriC service-corresponding PDU session has been established, the AMF may produce a single N2 PDU session request by integrating the information about the plurality of PDU session corresponding to the eMBB or mIoT, not the CriC service, and transfer the N2 PDU session request to the (R)AN. That is, the interactions between the UE and the CN may be minimized by integrating the N2 PDU session request ack and the N2 PDU session request related to establishing a plurality of PDU sessions into a single message and exchanging the same between the (R)AN and the AMF.

Since operations 1200 and 1210 of FIG. 22 correspond to operations 1100 and 1120 of FIG. 21, no detailed description thereof is presented below.

Since operations 1220 and 1230 of FIG. 22 correspond to operations 1130 of FIG. 21, no detailed description thereof is presented below.

As is apparent from the foregoing description, according to an embodiment, a method for establishing a plurality of PDU sessions may adopt a new indicator called an indicator for multiple PDU session establishment (iMess), shortening the process for a UE to request and establish multiple PDU sessions via an adaptive interaction between the network functions based on the iMess.

According to an embodiment, a method for establishing a plurality of PDU sessions may further include a proxy-based NF connected to each of an (R)AN and an NF, addressing the conventional stickiness issue while shortening the latency consumed in delivering a new NAS message after changing the NF. For example, according to an embodiment, a method for establishing a plurality of PDU sessions adopts a proxy-based NF in supporting connectivity between a UE and an AMF, reducing the latency consumed in transferring a new NAS message after the AMF is changed.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a user equipment (UE) for establishing a plurality of protocol data unit (PDU) sessions between the UE and a data network (DN), the method comprising:
    transmitting a request message to establish the plurality of PDU sessions to at least one network function (NF) of a plurality of NFs, the request message including an access and mobility management function (AMF) identity (ID) field, a flag field, and a plurality of public service identify (PSI) fields for PDU session IDs of the plurality of PDU sessions; and
    establishing the plurality of PDU sessions between the UE and the DN based on the PDU session IDs which are sorted in an order of establishing the plurality of PDU sessions based on a priority,
    wherein the priority is determined based on a strength of signal received by the UE and information associated with particular services corresponding to the plurality of PDU sessions, and
    wherein each of the plurality of PDU sessions corresponds to a network slice (NS) for a particular service.

2. The method of claim 1, wherein the information associated with the particular service includes information associated with a critical (Cric) service, an enhanced mobile broadband (eMBB) service, and a massive internet of things (mIoT) service, and wherein among the plurality of PDU sessions, a PDU session corresponding to the CriC service has a highest priority in establishing the plurality of PDU sessions.

3. The method of claim 2, wherein, in case that there is a plurality of PDU sessions corresponding to the CriC service, an order of establishing the plurality of PDU sessions corresponding to the CriC service is determined by a user's input.

4. The method of claim 2, wherein, in case that there is a plurality of PDU sessions corresponding to the CriC service, an order of establishing the plurality of PDU sessions corresponding to the CriC service is determined based on an environment of the UE and a requirement for utilization, latency, and reliability of each of a plurality of applications.

5. The method of claim 2, wherein, in case that there is a plurality of PDU sessions corresponding to the eMBB service and the mIoT service, one signal obtained by integrating the information associated with the plurality of PDU sessions is exchanged between a RAN and an AMF among the plurality of NFs.

6. The method of claim 1, wherein the request message is a non-access stratum (NAS) message that includes request information associated with establishing the plurality of PDU sessions, and wherein the request message is transmitted while establishing a first PDU session of the plurality of PDU sessions.

7. The method of claim 1, further comprising exchanging signals to establish the plurality of PDU sessions among the UE, a radio access network (RAN), and the plurality of NFs based on the request message and receiving, by an access and mobility management function (AMF) among the plurality of NFs, subscription data of the UE related to the plurality of PDU sessions from a unified data management (UDM), and wherein the subscription data is data received while establishing a first PDU session.

8. The method of claim 7, wherein the subscription data is transmitted to a session management function (SMF).

9. The method of claim 1, wherein:
    the AMF ID field includes information associated with AMF to which the UE sends a PDU session establishment request,
    the flag field includes information associated with a number of the plurality of PDU sessions that the UE intends to establish and the number of PDU sessions providing a critical (CriC) service among the plurality of PDU sessions, and
    the plurality of PSI fields includes information associated with the request message for establishing the plurality of PDU sessions and wherein the plurality of PSI fields being sorted from top to down corresponding to the priority of the established plurality of PDU sessions.

10. A user equipment (UE) configured to establish a plurality of protocol data unit (PDU) sessions with a data network (DN), the UE comprising:
    a transceiver configured to: transmit a request message to establish the plurality of PDU sessions to at least one network function (NF) of a plurality of NFs, the request message including an access and mobility management function (AMF) identity (ID) field, a flag field, and a plurality of public service identify (PSI) fields for PDU session IDs of the plurality of PDU sessions; and
    a controller configured to establish the plurality of PDU sessions between the UE and the DN based on the PDU session IDs which are sorted in an order of establishing the plurality of PDU sessions based on a priority,
    wherein the priority is determined based on a strength of received signal by the UE and information associated with particular services corresponding to the plurality of PDU sessions,
    wherein each of the plurality of PDU sessions corresponds to a network slice (NS) for a particular service.

11. The UE of claim 10, wherein the information associated with the particular service includes information associated with a critical (Cric) service, an enhanced mobile broadband (eMBB) service, and a massive internet of things (mIoT) service, and wherein among the plurality of PDU sessions, a PDU session corresponding to the CriC service has a highest priority in establishing the plurality of PDU sessions.

12. The UE of claim 11, wherein, in case that there is a plurality of PDU sessions corresponding to the CriC service, an order of establishing the plurality of PDU sessions corresponding to the CriC service is determined by a user's input.

13. The UE of claim 11, wherein, in case that there is a plurality of PDU sessions corresponding to the CriC service, an order of establishing the plurality of PDU sessions corresponding to the CriC service is determined based on an environment of the UE and a requirement for utilization, latency, and reliability of each of a plurality of applications.

* * * * *